United States Patent [19]

Kawasaki et al.

[11] Patent Number: 5,698,651

[45] Date of Patent: Dec. 16, 1997

[54] ETHYLENE COPOLYMER RUBBER, VULCANIZABLE RUBBER COMPOSITION CONTAINING THE COPOLYMER RUBBER, AND PROCESS FOR PREPARING THE COPOLYMER RUBBER

[75] Inventors: Masaaki Kawasaki, Ichihara; Toshiyuki Tsutsui, Waki-cho; Tetsuo Tojo; Takashi Hakuta, both of Ichihara, all of Japan

[73] Assignee: Mitsui Petrochemical Industries, Ltd., Tokyo, Japan

[21] Appl. No.: 665,342

[22] Filed: Jun. 17, 1996

[30] Foreign Application Priority Data

Jun. 28, 1995 [JP] Japan .................. 7-162676

[51] Int. Cl.$^6$ .................. C08F 236/20; C08F 4/64
[52] U.S. Cl. .................. 526/336; 526/127; 526/132; 526/160; 526/170; 526/282; 526/283; 526/943; 524/554; 524/579
[58] Field of Search .................. 526/282, 283, 526/336, 160, 161, 170, 308, 127, 132, 339; 524/554, 576, 579

[56] References Cited

U.S. PATENT DOCUMENTS 5,229,478  7/1993  Floyd et al. .................. 526/336 X
5,292,845  3/1994  Kawasaki et al. .................. 526/336

FOREIGN PATENT DOCUMENTS 2121711  6/1987  Japan .................. 526/160

OTHER PUBLICATIONS

Abstract of Japanese Laid–Open Patent Publication No. 5-262827 (Oct. 12, 1993).
Abstract of Japanese Laid–Open Patent Publication No. 63-008408 (Jan. 14, 1988).
Abstract of European Published Patent Application No. 0 485 822 (May 20, 1992).
Abstract of European Published Patent Application No. 0 320 762 (Jun. 21, 1989).
Wild, et al. "ansa-Metallocene Derivatives . . . ", J. Organometallic Chemistry, 228 (1985), pp. 63–67.
Abstract of European Published Patent Application No. 0 549 900 (Jul. 7, 1993).

*Primary Examiner*—Fred Teskin
*Attorney, Agent, or Firm*—Sherman and Shalloway

[57] ABSTRACT

Disclosed is an ethylene copolymer rubber which is a random copolymer rubber of (a) ethylene, (b) an α-olefin of 3 to 20 carbon atoms, (c) a nonconjugated polyene containing, in one molecule, one carbon-to-carbon double bond polymerizable by a metallocene catalyst among carbon-to-carbon double bonds, and (d) a nonconjugated polyene containing, in one molecule, two carbon-to-carbon double bonds polymerizable by the metallocene catalyst among carbon-to-carbon double bonds. The ethylene copolymer rubber has excellent moldability, high vulcanization rate, good mechanical properties such as high vulcanization strength, excellent low-temperature flexibility and thermal aging resistance. Also disclosed is a process for preparing the ethylene copolymer rubber with high activity, high conversion ratio of α-olefin and high random copolymerizability.

10 Claims, No Drawings

ETHYLENE COPOLYMER RUBBER, VULCANIZABLE RUBBER COMPOSITION CONTAINING THE COPOLYMER RUBBER, AND PROCESS FOR PREPARING THE COPOLYMER RUBBER

FIELD OF THE INVENTION

The present invention relates to an ethylene copolymer rubber, a rubber composition containing the copolymer rubber and a process for preparing the copolymer rubber. More particularly, the invention relates to a novel ethylene copolymer rubber not only showing excellent extrusion moldability, thermal aging resistance and low-temperature flexibility but also having high vulcanization rate and good mechanical properties, and to a rubber composition containing the copolymer rubber and a process for preparing the copolymer rubber.

BACKGROUND OF THE INVENTION

Conventionally, ethylene-propylene-polyene copolymer rubbers have been widely used as automobile industrial materials, electrical wire materials, building and civil engineering materials, and industrial materials, because of their excellent weathering resistance, ozone resistance and thermal aging resistance.

The ethylene-propylene-polyene copolymer rubbers applied to these uses have been desired to have, for example, excellent moldability, high vulcanization rate and high vulcanization strength.

Examples of the ethylene-propylene-polyene copolymer rubbers conventionally known include an ethylene-propylene-5-ethylidene-2-norbornene (ENB) copolymer rubber, an ethylene-propylene-dicyclopentadiene copolymer rubber and an ethylene-propylene-1,4-hexadiene copolymer rubber. Of these, the ethylene-propylene-5-ethylidene-2-norbornene copolymer rubber has a higher vulcanization rate than other unsaturated ethylene copolymer rubbers.

However, the ethylene-propylene-5-ethylidene-2-norbornene copolymer rubber has a problem of poor extrusion moldability.

Therefore, development of an ethylene copolymer rubber having excellent extrusion moldability, high vulcanization rate and good mechanical properties such as high vulcanization strength is now desired.

The present inventors have proposed, in Japanese Patent Laid-Open Publication No. 262827/1993 (Japanese Patent Application No. 275871/1992), an ethylene-α-olefin-diene copolymer rubber of terpolymer type which is a random copolymer of ethylene, an α-olefin and 7-methyl-1,6-octadiene (MOD) and has an ethylene/α-olefin molar ratio of 40/60 to 90/10, a MOD content of 0.4 to 25% by mol, an intrinsic viscosity ($\eta$), as measured in Decalin (decahydronaphthalene, E.I. duPont de Nemours & Co., Wilmington, Del.) at 135° C., satisfying the condition of 0.1 dl/g<($\eta$)<8 dl/g, an intensity ratio D (T$\alpha\beta$/T$\alpha\alpha$) of not more than 0.5, a B value of 1.00 to 1.50, and a glass transition temperature (Tg) of −53° C.

This terpolymer rubber is obtained in the presence of a transition metal catalyst comprising a Group IVB transition metal (zirconium) compound containing a ligand having cyclopentadienyl skeleton and an organoaluminum oxy-compound. In the preparation of the terpolymer rubber, plural kinds of olefins are copolymerized with high activities, so that the terpolymer rubber has a narrow composition distribution and excellent low temperature flexibility.

Even in the terpolymer rubber, however, there is a room for further improvement in the balance among the mechanical properties (e.g., vulcanization strength), extrusion moldability, vulcanization rate, low-temperature flexibility and thermal aging resistance.

The present inventors have also proposed, in Japanese Patent Laid-Open Publication No. 8408/1988, an ethylene-α-olefin-polyene random copolymer which is an ethylene copolymer rubber obtained by random copolymerizing ethylene, an α-olefin of 3 to 10 carbon atoms and polyenes of 5-ethylidene-2-norbornene (ENB) and 5-vinyl-2-norbornene (VNB) and has an ethylene/α-olefin molar ratio of 50/50 to 95/5, a ratio of ENB content to VNB content of 1/1 to 45/1 (ENB/VNB), an iodine value of 2 to 50, an intrinsic viscosity ($\eta$), as measured in Decalin (decahydronaphthalene, E.I. duPont de Nemours & Co., Wilmington, Del.) at 135° C., of 0.7 to 6.0 dl/g, and a Q value (Mw/Mn) of not less than 6.

This copolymer rubber is obtained by random copolymerizing the above components in a hydrocarbon solvent in the presence of a soluble vanadium compound and an organoaluminum compound. Therefore, the copolymer rubber has a better balance among the extrusion moldability, vulcanization rate and vulcanization strength as compared with the conventional copolymer rubbers, and besides, it shows excellent shape retention. In this copolymer rubber, however, there is a room for further improvement in the vulcanization strength, low-temperature flexibility and thermal aging resistance.

Accordingly, now desired is an ethylene copolymer rubber having excellent extrusion moldability, high vulcanization rate, good mechanical properties such as high vulcanization strength, excellent low-temperature flexibility and thermal aging resistance. Further, desired is a process for preparing the ethylene copolymer rubber in which ethylene, an α-olefin of 3 or more carbon atoms, a nonconjugated polyene containing one polymerizable carbon-to-carbon double bond in one molecule and a nonconjugated polyene containing two polymerizable carbon-to-carbon double bonds in one molecule can be copolymerized with high activity, and high conversion ratio of α-olefin.

OBJECT OF THE INVENTION

The present invention is intended to solve such problems associated with the prior art as described above, and it is an object of the invention to provide an ethylene copolymer rubber which is excellent in extrusion moldability, high vulcanization rate, good mechanical properties such as high vulcanization strength, low-temperature flexibility and thermal aging resistance, and to provide a rubber composition containing the copolymer rubber and a process for preparing the copolymer rubber.

SUMMARY OF THE INVENTION

The ethylene copolymer rubber according to the invention is a random copolymer rubber of (a) ethylene, (b) an α-olefin of 3 to 20 carbon atoms, (c) a nonconjugated polyene containing, in one molecule, one carbon-to-carbon double bond polymerizable by a metallocene catalyst among carbon-to-carbon double bonds, and (d) a nonconjugated polyene containing, in one molecule, two carbon-to-carbon double bonds polymerizable by the metallocene catalyst among carbon-to-carbon double bonds; and has the following properties:

(i) the copolymer rubber contains (a') units from ethylene and (b') units from the α-olefin of 3 to 20 carbon atoms in a molar ratio of 90/10 to 40/60 ((a')/(b')), (ii) the copolymer rubber contains 0.1 to 10% by mol of (c') units from the nonconjugated polyene containing, in one molecule, one carbon-to-carbon double bond polymerizable by the metallocene catalyst among carbon-to-carbon double bonds, (iii) the copolymer rubber contains 0.1 to 3% by mol of (d') units from the nonconjugated polyene containing, in one molecule, two carbon-to-carbon double bonds polymerizable by the metallocene catalyst among carbon-to-carbon double bonds, (iv) the intrinsic viscosity (η), as measured in Decalin (decahydronaphthalene, E.I. duPont de Nemours & Co., Wilmington, Del.) at 135° C., is in the range of 0.1 to 10 dl/g, and (v) the intensity ratio D of Tαβ to Tαα in the $^{13}$C-NMR spectrum, Tαβ/αα, is not more than 0.5.

In a preferable embodiment of the invention, the ethylene copolymer rubber has the following properties:

(vi) the B value, as determined by the $^{13}$C-NMR spectrum and the following equation, is in the range of 1.0 to 2.0, $$B \text{ value} = (P_{OE})/(2 \cdot (P_E) \cdot (P_O))$$

wherein ($P_E$) is a molar fraction of the units from ethylene (a') in the random copolymer rubber, ($P_O$) is a molar fraction of the units from the α-olefin (b') in the random copolymer rubber, and ($P_{OE}$) is a proportion of the number of the α-olefin-ethylene sequences to the number of all the dyad sequences in the random copolymer rubber.

Further, the ethylene copolymer rubber preferably has a ratio gη* of the intrinsic viscosity (η) of the ethylene copolymer rubber determined in the above property (iv) to the intrinsic viscosity $(η)_{blank}$ of a linear ethylene-propylene copolymer having the same weight-average molecular weight (measured by a light scattering method) as said ethylene copolymer rubber and having an ethylene content of 70% by mol, $(η)/(η)_{blank}$, is not more than 0.9.

Furthermore, the ethylene copolymer rubber has a ratio g' of the intrinsic viscosity (η) of the ethylene copolymer rubber determined in the property (iv) to the intrinsic viscosity $(η)_{blank}'$ in terms of a linear ethylene-propylene copolymer having an ethylene content of 70% by mol, as determined by gel permeation chromatography (GPC, 140° C., o-dichlorobenzene solvent) of the ethylene copolymer rubber, $(η)/(η)_{blank}$, is not more than 0.9.

In the ethylene copolymer rubber, the α-olefin (b) preferably has 4 or more carbon atoms, and the glass transition temperature Tg, as determined by DSC, is preferably not higher than −45° C., more preferably not higher than −50° C., particularly preferably not higher than −55° C.

In the process for preparing an ethylene copolymer rubber according to the invention, the above-mentioned ethylene copolymer rubber is prepared by random copolymerizing, in the presence of a metallocene catalyst, (a) ethylene, (b) an α-olefin of 3 to 20 carbon atoms, (c) a nonconjugated polyene containing, in one molecule, one carbon-to-carbon double bond polymerizable by the metallocene catalyst among carbon-to-carbon double bonds, and (d) a nonconjugated polyene containing, in one molecule, two carbon-to-carbon double bonds polymerizable by the metallocene catalyst among carbon-to-carbon double bonds.

The metallocene catalyst preferably contains a metallocene compound represented by the following formula (III) or (IV):

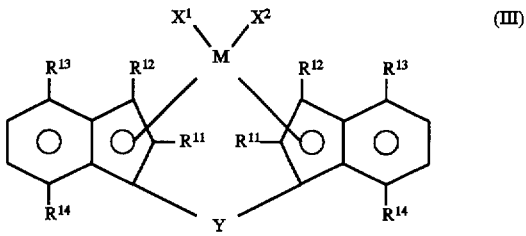

wherein M is a transition metal of Group IVB of the periodic table, $R^{11}$ and $R^{12}$ are each hydrogen, a halogen atom, a hydrocarbon group of 1 to 20 carbon atoms which may be substituted with halogen, a silicon-containing group, an oxygen-containing group, a sulfur-containing group, a nitrogen-containing group or a phosphorus-containing group, $R^{13}$ and $R^{14}$ are each an alkyl group of 1 to 20 carbon atoms, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group —O—, —CO—, —S—, —SO—, —SO$_2$—, —NR$^7$—, —P(R$^7$)—, —P(O)(R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms);

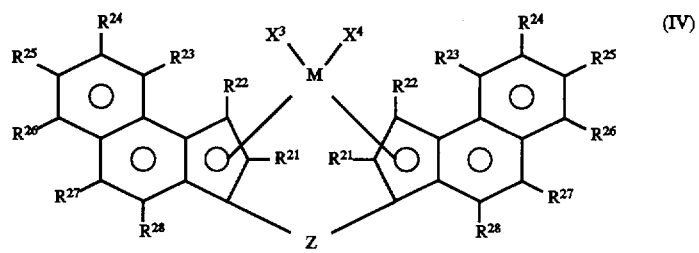

wherein M is a transition metal of Group IVB of the periodic table, $R^{21}$'s may be the same as or different from each other, and are each hydrogen, a halogen atom, an alkyl group of 1 to 10 carbon atoms which may be halogenated, an aryl group of 6 to 10 carbon atoms, —NR$_2$, —SR, —OSiR$_3$, —SiR$_3$ or —PR$_2$ (R is a halogen atom, an alkyl group of 1 to 10 carbon atoms or an aryl group of 6 to 10 carbon atoms), $R^{22}$ to $R^{28}$ are each the same as $R^{21}$, or adjacent two of $R^{22}$ to $R^{28}$ may form an aromatic or aliphatic ring together with an atom to which they are bonded, $X^3$ and $X^4$ may be the same as or different from each other, and are each hydrogen, a halogen atom, OH group, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms, and Z is

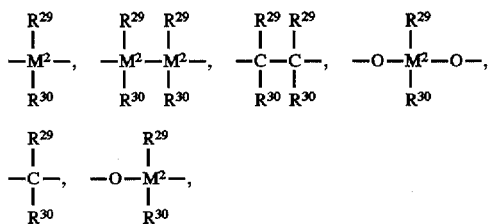

$=BR^{29}$, $=AlR^{29}$, —Ge, —Sn—, —O—, —S—, $=SO$, $—SO_2$, $=NR^{29}$, $=CO$, $=PR^{29}$ or $=P(O)R^{29}$ ($R^{29}$ and $R^{30}$ may be the same as or different from each other, they are each hydrogen, a halogen atom, an alkyl group of 1 to 10 carbon atom, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or $R^{29}$ and $R^{30}$ may form a ring together with an atom to which they are bonded, and $M^2$ is silicon, germanium or tin).

The rubber composition according to the invention comprises the above-mentioned ethylene copolymer rubber and at least one ingredient selected from the following ingredients:

a reinforcing agent in an amount of not more than 300 parts by weight based on 100 parts by weight of the ethylene copolymer rubber, a softener in an amount of not more than 200 parts by weight based on 100 parts by weight of the ethylene copolymer rubber, and a vulcanizing agent.

The ethylene copolymer rubber of the invention has excellent extrusion moldability, high vulcanization rate and good mechanical properties such as high strength after vulcanized (vulcanization strength).

The meaning of the terms "ethylene copolymer rubber" used herein comprehends both of "unvulcanized rubber" and "vulcanized rubber", so far as they do not run counter to the spirit of the terms. The ethylene copolymer rubber is sometimes referred to "ethylene copolymer" or "copolymer" hereinafter.

DETAILED DESCRIPTION OF THE INVENTION

The ethylene copolymer rubber, the vulcanizable rubber composition containing the copolymer rubber and the process for preparing the copolymer rubber according to the present invention are described in detail hereinafter.

Ethylene copolymer rubber

The ethylene copolymer rubber of the invention is a random copolymer of (a) ethylene, (b) an α-olefin of 3 to 20 carbon atoms, (c) a nonconjugated polyene containing, in one molecule, one carbon-to-carbon double bond polymerizable by a metallocene catalyst among carbon-to-carbon double bonds, and (d) a nonconjugated polyene containing, in one molecule, two carbon-to-carbon double bonds polymerizable by the metallocene catalyst among carbon-to-carbon double bonds.

Examples of the α-olefins of 3 to 20 carbon atoms used for forming the random copolymer rubber include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Of these, preferred are propylene, 1-butene, 1-hexene, and 1-octene, and more preferred are α-olefins of 4 or more carbon atoms, such as 1-butene, 1-hexene and 1-octene. Particularly, the ethylene copolymer rubber having an α-olefin of 4 or more carbon atoms tends to impart excellent thermal aging resistance and low-temperature flexibility (permanent compression set) to its vulcanized product. These α-olefins may be used singly or in combination.

The nonconjugated polyenes employable in the invention are (c) a nonconjugated polyene containing, in one molecule, one carbon-to-carbon double bond polymerizable by a metallocene catalyst among carbon-to-carbon double bonds, and (d) a nonconjugated polyene containing, in one molecule, two carbon-to-carbon double bonds polymerizable by the metallocene catalyst among carbon-to-carbon double bonds (both being sometimes generically referred to simply as "nonconjugated polyene" hereinafter).

In the nonconjugated polyene (c) containing, in one molecule, one carbon-to-carbon double bond polymerizable by a metallocene catalyst among carbon-to-carbon double bonds, a chain polyene having vinyl groups ($CH_2=CH—$) at the both ends is not included. When there are two or more carbon-to-carbon double bonds are present in the nonconjugated polyene (c), it is preferable that only one carbon-to-carbon double bond is present as a vinyl group at the end of the molecule and other carbon-to-carbon double bonds ($C=C$) are present in the form of inside olefinic structure in the molecular chain (including main chain and side chain). The nonconjugated polyene (c) includes an aliphatic polyene and an alicyclic polyene.

Examples of the aliphatic polyenes include:

1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene,
5-ethyl-1,5-nonadiene, 6-ethyl-1,5-nonadiene,
6-methyl-1,6-nonadiene, 7-methyl-1,6-nonadiene,
6-ethyl-1,6-nonadiene, 7-ethyl-1,6-nonadiene,
7-methyl-1,7-nonadiene, 8-methyl-1,7-nonadiene,
7-ethyl-1,7-nonadiene, 5-methyl-1,4-decadiene, 5-ethyl-1,4-decadiene,
5-methyl-1,5-decadiene, 6-methyl-1,5-decadiene,
5-ethyl-1,5-decadiene, 6-ethyl-1,5-decadiene,
6-methyl-1,6-decadiene, 6-ethyl-1,6-decadiene,
7-methyl-1,6-decadiene, 7-ethyl-1,6-decadiene,
7-methyl-1,7-decadiene, 8-methyl-1,7-decadiene,
7-ethyl-1,7-decadiene, 8-ethyl-1,7-decadiene,
8-methyl-1,8-decadiene, 9-methyl-1,8-decadiene,
8-ethyl-1,8-decadiene, 6-methyl-1,6-undecadiene and
9-methyl-1,8-undecadiene. Of these, preferred is
7-methyl-1,6-octadiene.

In the present invention, these nonconjugated polyenes can be used singly or in combination of two or more kinds.

The alicyclic polyene is, for example, a polyene consisting of alicyclic parts having one carbon-to-carbon double bond (unsaturated bond) and chain parts having inside olefinic bond (carbon-to-carbon double bond), and examples of such polyenes include 5-ethylidene-2-norbornene (ENB), 5-propylidene-2-norbornene and 5-butylidene-2-norbornene. Of these, 5-ethylidene-2-norbornene (ENB) is preferably employed.

Other examples of the alicyclic polyenes are 2-methyl-2,5-norbornadiene and 2-ethyl-2,5-norbornadiene.

In the present invention, these nonconjugated polyenes (c) can be used singly or in combination of two or more kinds.

Examples of the nonconjugated polyene (d) containing, in one molecule, two carbon-to-carbon double bonds polymerizable by the metallocene catalyst among carbon-to-carbon double bonds include:

5-alkenyl-2-norbornenes, such as 5-vinyl-2-norbornene (VNB) and 5-allyl-2-norbornene;

alicyclic polyenes, such as 2,5-norbornadiene, dicyclopentadiene (DCPD), norbornadiene and tetracyclo[4,4,0,1$^{2.5}$,1$^{7.10}$]deca-3,8-diene; and α,ω-dienes, such as 1,7-octadiene and 1,9-decadiene.

Of these, preferably used are 5-alkenyl-2-norbornenes, dicyclopentadiene, 2,5-norbornadiene, 1,7-octadiene and 1,9-decadiene, and particularly preferably used is 5-vinyl-2-norbornene (VNB).

In the ethylene copolymer rubber (also referred to simply as "copolymer" or "ethylene copolymer"), constituent units derived from each monomers of (a) ethylene, (b) the α-olefin of 3 to 20 carbon atoms, (c) the nonconjugated polyene containing, in one molecule, one carbon-to-carbon double bond polymerizable by a metallocene catalyst among carbon-to-carbon double bonds, and (d) the nonconjugated polyene containing, in one molecule, two carbon-to-carbon double bonds polymerizable by the metallocene catalyst among carbon-to-carbon double bonds are arranged at random and linked to each other, so that the copolymer rubber has a branched structure caused by the nonconjugated polyenes and a main chain in the form of a substantially linear structure. A substantially linear and crosslinked gel-free structure of the copolymer (rubber) can be confirmed by the fact that the copolymer is dissolved in an organic solvent and substantially contains no insoluble matter. For example, this can be confirmed by the fact that the copolymer is completely dissolved in decalin at 135° C. in the measurement of the intrinsic viscosity (η).

Amounts of constituent units

The ethylene copolymer rubber of the invention contains the constituent units (a') from ethylene (ethylene units) and the constituent units (b') from the α-olefin of 3 to 20 carbon atoms (α-olefin units) in a molar ratio of 90/10 to 40/60 ((a')/(b')), preferably 85/15 to 50/50, more preferably 82/18 to 55/45.

If the ethylene units/α-olefin units molar ratio ((a')/(b')) exceeds 90/10, the copolymer rubber tends to become resinous. If the ratio is less than 40/60, the low-temperature properties of the copolymer rubber tend to be lowered.

In the ethylene copolymer rubber of the invention, there is no specific limitation on the amounts of (a') the ethylene unit and the amounts of (b') the α-olefin units, as far as these units satisfy the above-defined (a')/(b') molar ratio. However, the ethylene copolymer rubber of the invention contains the ethylene units (a') in amounts of usually 90 to 40% by mol, preferably 85 to 50% by mol, more preferably 82 to 55% by mol and the α-olefin units (b') in amounts of usually 10 to 60% by mol, preferably 15 to 50% by mol, more preferably 18 to 45% by mol, based on 100% by mol of the total amounts of the ethylene units and the α-olefin units.

The ethylene copolymer rubber of the invention contains the constituent units (c') from the nonconjugated polyene containing, in one molecule, one carbon-to-carbon double bond polymerizable by the later-described metallocene catalyst among carbon-to-carbon double bonds in amounts of 0.1 to 10% by mol, preferably 0.2 to 8% by mol, more preferably 0.5 to 5% by mol. When the amounts of the units (c') are less than 0.1% by mol, sulfur vulcanization of the copolymer rubber tends to be difficult. When the amounts thereof exceeds 10% by mol, the environmental aging resistance of the copolymer rubber tends to be lowered.

Further, the ethylene copolymer rubber of the invention contains the constituent units (d') from the nonconjugated polyene containing, in one molecule, two carbon-to-carbon double bonds polymerizable by the later-described metallocene catalyst among carbon-to-carbon double bonds in amounts of 0.1 to 3% by mol, preferably 0.2 to 2.5% by mol, more preferably 0.3 to 2.0% by mol. When the amounts of the units (d) are less than 0.1% by mol, the copolymer rubber hardly exhibit excellent extrusion moldability. If the amounts thereof exceeds 3% by mol, a crosslinked gel structure tends to be formed in the copolymer rubber.

In the ethylene copolymer rubber of the invention, the molar ratio of the units (c') to the units (d') (units (c')/units (d')) is in the range of 1/3 to 30/1, preferably 1/2 to 20/1, more preferably 1/1 to 10/1.

When the molar ratio of the units (c') to the units (d') is outside the above range, the balance between the vulcanization rate and the extrusion moldability tends to be bad.

Intrinsic viscosity [η]

The intrinsic viscosity [η] of the ethylene copolymer rubber, as measured in Decalin (decahydronaphthalene, E.I. duPont de Nemours & Co., Wilmington, Del.) at 135° C., is in the range of 0.1 to 10 dl/g, preferably 0.5 to 5 dl/g, more preferably 0.8 to 4 dl/g.

When the intrinsic viscosity is less than 0.1 dl/g, the strength of the copolymer rubber after vulcanized (vulcanization strength) tends to be diminished. When the intrinsic viscosity exceeds 10 dl/g, the processability of the copolymer rubber tends to be lowered.

Iodine value

The iodine value of the ethylene copolymer rubber is in the range of 0.5 to 50, preferably 1 to 40, more preferably 5 to 35.

The ethylene copolymer rubber having an iodine value within the above range has a high vulcanization rate and can be vulcanized at a high speed.

D value (Tαβ to Tαα)

The D value, namely, an intensity (area) ratio D of Tαβ to Tαα in the $^{13}$C-NMR spectrum of the ethylene copolymer rubber, Tαβ/Tαα, is not more than 0.5, particularly not more than 0.3.

The intensity ratio D of the random copolymer rubber varies depending on the kind of the α-olefin used for forming the random copolymer rubber.

Tαβ and Tαα in the $^{13}$C-NMR spectrum are each a peak intensity of CH$_2$ in the units derived from the α-olefin of 3 or more carbon atoms, and they mean two kinds of CH$_2$ having different positions to the tertiary carbon as shown below.

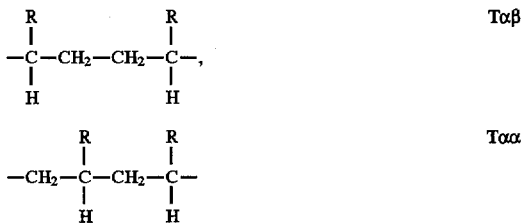

The intensity ratio D of the random copolymer rubber can be determined in the following manner.

The $^{13}$C-NMR spectrum of the random copolymer rubber is measured using a hexachlorobutadiene/d$_6$-benzene (2/1 by volume) mixed solution of a sample (concentration: 5% by weight) at 25° C. and 67.8 MHz on the basis of d$_6$-benzene (128 ppm) by means of a NMR measuring device (e.g., JEOL-GX270 manufactured by Japan Electron Optics Laboratory Co., Ltd.).

Analysis of the $^{13}$C-NMR spectrum was basically carried out in accordance with the proposals of Lindemann Adams (Analysis Chemistry 43, p. 1,245 (1971)) and J. C. Randall (Review Macromolecular Chemistry Physics, C29, 201 (1989)).

The intensity ratio D is now described in more detail with reference to a tetrapolymer rubber of (a) ethylene, (b) an α-olefin (propylene), (c) 5-ethylidene-2-norbornene (ENB) and (d) 5-vinyl-2-norbornene (VNB).

In the $^{13}$C-NMR spectrum of this tetrapolymer rubber, the peak which appears at 45 to 46 ppm is assigned to Tαα, and the peak which appears at 32 to 33 ppm is assigned to Tαβ.

The intensity ratio D is calculated as a ratio between the integrated values of those peak areas.

The intensity ratio D thus determined is considered as an index of a proportion of occurrence of the 2,1-insertion reaction of propylene after the 1,2-insertion reaction or an index of a proportion of occurrence of the 1,2-insertion reaction or propylene after the 2,1-insertion reaction. Therefore, as the intensity ratio D becomes larger, the linkage direction of the α-olefin (propylene) becomes more irregular. To the contrary, as the D value becomes smaller, the linkage direction of the α-olefin (propylene) becomes more regular. When the regularity is high, the molecular chains tend to be assembled and the vulcanized random copolymer tends to have high strength.

In the present invention, the random copolymer rubber having an intensity ratio D of not more than 0.5 is preferably obtained by copolymerizing ethylene (a), the α-olefin (b) and two kinds of the nonconjugated polyenes (c) and (d) using a specific Group IVB metallocene catalyst as described later. However, even if (a) ethylene, (b) propylene, (c) 5-ethylidene-2-norbornene (ENB) and (d) 5-vinyl-2-norbornene (VNB) are copolymerized in the presence of a Group VB metallocene (e.g., vanadium) catalyst, an ethylene-propylene-ENB-VNB copolymer rubber having an intensity ratio D of not more than 0.5 may not be obtained. The same applies to other α-olefins than propylene.

B value

The B value of the ethylene copolymer rubber, as determined by the $^{13}$C-NMR spectrum and the following equation, is preferably in the range of 1.0 to 2.0.

$$B \text{ value} = (P_{OE})/(2 \cdot (P_E) \cdot (P_O))$$

wherein ($P_E$) is a molar fraction of the units derived from ethylene (a') in the random copolymer rubber; ($P_O$) is a molar fraction of the units derived from the α-olefin (b') in the random copolymer rubber; and ($P_{OE}$) is a proportion of the number of the α-olefin-ethylene sequences to the number of all the dyad sequences in the random copolymer rubber.

This B value is an index of distribution of the ethylene and the α-olefin in the copolymer rubber, and it can be determined based on the reports by J. C. Randall (Macromolecules, 15, 353 (1982)) and J. Ray (Macromolecules, 10, 773 (1977)).

As the B value becomes larger, the block-like sequence of the ethylene or the α-olefin becomes shorter, and this means that the sequence distribution of ethylene and the α-olefin is uniform and the composition distribution of the copolymer rubber is narrow. As the B value becomes smaller (particularly smaller than 1), the composition distribution of the copolymer rubber is widened, and such copolymer rubber does not sufficiently exhibit its properties such as strength when vulcanized, differently from a copolymer rubber of narrow composition distribution.

In the present invention, the random copolymer rubber having a B value of 1.0 to 2.0 is preferably obtained by copolymerizing ethylene, an α-olefin and two kinds of specific nonconjugated polyenes using a specific Group IVB metallocene catalyst as described later. However, even if ethylene, an α-olefin and nonconjugated polyenes are copolymerized in the presence of a non-metallocene type titanium catalyst, a copolymer rubber comprising ethylene, an α-olefin and two kinds of nonconjugated polyenes and having a B value within the above range cannot be obtained.

gη* value

The gη* value defined as a ratio of the intrinsic viscosity (η) of the ethylene copolymer rubber determined in the above property to the intrinsic viscosity (η)$_{blank}$ of a linear ethylene-propylene copolymer having the same weight-average molecular weight (measured by a light scattering method) as the ethylene copolymer rubber and having an ethylene content of 70% by mol, (η)/(η)$_{blank}$, is not more than 0.9, preferably 0.2 to 0.85, more preferably 0.4 to 0.8. When the gη* value exceeds 0.9, the quantity of the long-chain branches formed in the molecule is small, leading to lowering of the processability of the copolymer rubber, for example, low shape retention, low extrusion rate, high value of surface roughness and poor surface condition.

The (η)$_{blank}$ is determined in the following manner. A weight-average molecular weight Mw of an ethylene-propylene-nonconjugated polyenes copolymer (ethylene copolymer rubber) is measured by a light scattering method. The weight-average molecular weight Mw is converted into a viscosity-average molecular weight Mv, and the (η)$_{blank}$ is calculated by the following equation.

$$(\eta)_{blank} = 7.2 \times 10^{-4} Mv^{0.667}$$

g' value

A ratio g' of the intrinsic viscosity (η) of the ethylene copolymer rubber determined above to the intrinsic viscosity (η)$_{blank}$' in terms of a linear ethylene-propylene copolymer having an ethylene content of 70% by mol, as determined by gel permeation chromatography (GPC, 140° C., o-dichlorobenzene solvent) of the ethylene copolymer rubber, $(\eta)/(\eta)_{blank}'$, is not more than 0.9, preferably 0.2 to 0.85, more preferably 0.4 to 0.8. When the g' value exceeds 0.9, the quantity of the long-chain branches formed in the molecule is small, leading to lowering of the processability of the copolymer rubber, for example, low shape retention, low extrusion rate, high value of surface roughness and poor surface condition.

In order to determine the $(\eta)_{blank}'$, GPC of the ethylene copolymer rubber is first carried out to obtain a molecular weight $M_{i-PSt}$ in terms of polystyrene of each fraction. Then, the molecular weight $M_{i-PSt}$ is converted into a molecular weight $M_{i-EPR}$ in terms of EPR using the following equations.

$$(\eta)_{i-PSt} \cdot M_{i-PSt} = (\eta)_{i-EPR} \cdot M_{i-EPR}$$

$$(\eta)_{i-PSt} = 1.37 \times 10^{-4} M_{i-PSt}^{0.686}$$

$$(\eta)_{i-EPR} = 7.2 \times 10^{-4} M_{i-EPR}^{0.667}$$

Then, the molecular weight $M_{i-EPR}$ thus obtained is converted into $(\eta)_{i-blank}'$ of each fraction using the following equation.

$$(\eta)_{i-blank}' = 7.2 \times 10^{-4} M_{i-EPR}^{0.667}$$

The symbol "i" used herein indicates each fraction obtained by GPC

Then, $(\eta)_{i-blank}'$ obtained above is applied to the following equation to obtain $(\eta)_{blank}'$.

$$(\eta)_{blank}' = \Sigma \omega_i (\eta)_{i-blank}' / \Sigma \omega_i$$

wherein w is a weight fraction.

Thus, $(\eta)_{i-blank}'$ is calculated, and g' is determined as a $(\eta)/(\eta)_{blank}'$ ratio.

The ethylene copolymer rubber of the invention has a g$\eta$* value or a g' value considerably smaller than 1 as described above, and this means that a long-chain branch is formed in the molecule. Such random copolymer rubber has excellent processability.

Glass transition temperature Tg

The glass transition temperature Tg of the ethylene copolymer rubber, as measured by DSC (differential scanning calorimeter), is not higher than −45° C., preferably not higher than −50° C., particularly preferably not higher than −55° C.

By the use of the ethylene random copolymer rubber having a glass transition temperature Tg of not higher than −45° C., a rubber composition capable of providing a vulcanized rubber having excellent low-temperature flexibility can be obtained.

The ethylene copolymer rubber of the invention mentioned above has excellent extrusion moldability, high vulcanization rate and good mechanical properties such as high vulcanization strength.

The ethylene copolymer rubber of the invention may be used in an unvulcanized form, or it may be used in a vulcanized form after it is vulcanized by the later-described vulcanization method. When the ethylene copolymer rubber is used in a vulcanized form, its properties are prominently exhibited.

Further, the ethylene copolymer rubber may be vulcanized singly or may be covulcanized together with other rubber materials.

The ethylene copolymer rubber of the invention has a high vulcanization rate, and therefore even if a large amount of a vulcanizing agent is not used, it can be vulcanized for a shorter period of time or at a lower temperature as compared with the case of conventional ethylene copolymer rubbers. Therefore, a vulcanized rubber can be produced with high productivity.

The ethylene copolymer rubber of the invention has high covulcanizability with diene rubbers such as natural rubber, styrene-butadiene rubber, isoprene rubber, butadiene rubber, nitrile rubber and chloroprene rubber. Covulcanizates of the ethylene copolymer rubber and these diene rubbers show excellent mechanical properties, abrasion resistance, dynamic fatigue resistance and oil resistance inherent in the diene rubbers, and besides they have excellent weathering resistance, ozone resistance and thermal aging resistance.

Preparation of ethylene copolymer rubber

The ethylene copolymer rubber according to the invention can be obtained by random copolymerizing (a) ethylene, (b) an α-olefin of 3 to 20 carbon atoms, (c) nonconjugated polyene containing, in one molecule, one carbon-carbon double bond polymerizable by a specific catalyst and (d) a nonconjugated polyene containing, in one molecule, two carbon-carbon double bond polymerizable by a specific catalyst, preferably in the presence of a specific metallocene catalyst.

There is no specific limitation on the metallocene catalyst used in the invention, except that the metallocene catalyst contains the metallocene compound (A). For example, the metallocene catalyst may be formed from (A) the metallocene compound and (B) an organoaluminum oxy-compound and/or (C) a compound which reacts with the metallocene compound (A) to form an ion pair, or the catalyst may be formed from the component (A), the component (B) and/or the component (C), and (D) an organoaluminum compound.

Each components forming a metallocene catalyst used in the invention are described below in detail.

(A) Metallocene compound

In the invention, a compound represented by the following formula (I) is used as the metallocene compound (A).

$$ML_x \qquad (I)$$

In the formula (I), M is a transition metal selected from elements of Group IVB of the periodic table, e.g., zirconium, titanium or hafnium, and x is a valence of the transition metal.

L is a ligand coordinated to the transition metal. At least one ligand L is a ligand having a cyclopentadienyl skeleton which may have a substituent.

Examples of the ligands having a cyclopentadienyl skeleton include alkyl or cycloalkyl substituted cyclopentadienyl groups, such as cyclopentadienyl, methylcyclopentadienyl, ethylcyclopentadienyl, n-or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl.

Further, an indenyl group, a 4,5,6,7-tetrahydroindenyl group and a fluorenyl group can be also mentioned.

Those groups may be substituted with halogen atoms or trialkylsilyl groups.

Of the above ligands, particularly preferred are alkyl substituted cyclopentadienyl groups.

When the compound represented by the formula (I) has two or more ligands L having a cyclopentadienyl skeleton, two of the ligands having a cyclopentadienyl skeleton may be bonded to each other through an alkylene group such as ethylene or propylene, isopropylidene, a substituted alkylene group such as diphenylmethylene, a silylene group, or a substituted silylene group such as dimethylsilylene, diphenylsilylene or methylphenylsilylene.

Examples of L other than the ligand having a cyclopentadienyl skeleton include a hydrocarbon group of 1 to 12 carbon atoms, an alkoxyl group, an aryloxy group, a sulfonic acid-containing group (—SO$_3$R$^a$), a halogen atom or hydrogen, where R$^a$ is an alkyl group, an alkyl group substituted with a halogen atom, an aryl group, or an aryl group substituted with a halogen atom or an alkyl group.

Examples of the hydrocarbon groups of 1 to 12 carbon atoms include alkyl groups, cycloalkyl groups, aryl groups and aralkyl groups, more specifically, there can be mentioned:

alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl; aryl groups, such as phenyl and tolyl; and aralkyl group, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

The aryloxy group is, for example, phenoxy.

Examples of the sulfonic acid-containing group (—SO$_3$R$^a$) include methanesulfonato, p-toluenesulfonato, trifluoromethansulfonate and p-chlorobenzenesulfonato.

Examples of the halogen atoms include fluorine, chlorine, bromine and iodine.

The metallocene compound of the above formula wherein the valence of the transition metal is 4 is more specifically represented by the following formula (II):

wherein M is the above-mentioned transition metal, R$^2$ is a group (ligand) having a cyclopentadienyl skeleton, R$^3$, R$^4$ and R$^5$ are each independently a group having a cyclopentadienyl skeleton or the same as L other than the ligand having a cyclopentadienyl skeleton in the above formula (I), k is an integer of not less than 1, and k+l+m+n=4.

Listed below are examples of the metallocene compounds containing zirconium as M and containing at least two ligands having a cyclopentadienyl skeleton.

Bis(cyclopentadienyl)zirconium monochloride monohydride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)zirconium phenoxymonochloride,
Bis(methylcyclopentadienyl)zirconium dichloride,
Bis(ethylcyclopentadienyl)zirconium dichloride,
Bis(n-propylcyclopentadienyl)zirconium dichloride,
Bis(isopropylcyclopentadienyl)zirconium dichloride,
Bis(t-butylcyclopentadienyl)zirconium dichloride,
Bis(n-butylcyclopentadienyl)zirconium dichloride,
Bis(sec-butylcyclopentadienyl)zirconium dichloride,
Bis(isobutylcyclopentadienyl)zirconium dichloride,
Bis(hexylcyclopentadienyl)zirconium dichloride,
Bis(octylcyclopentadienyl)zirconium dichloride,
Bis(indenyl)zirconium dichloride,
Bis(4,5,6,7-tetrahydroindenyl)zirconium dichloride,
Bis(indenyl)zirconium dibromide,
Bis(cyclopentadienyl)zirconium dimethyl,
Bis(cyclopentadienyl)zirconium methoxychloride,
Bis(cyclopentadienyl)zirconium ethoxychloride,
Bis(fluorenyl)zirconium dichloride,
Bis(cyclopentadienyl)zirconiumbis(methanesulfonato),
Bis(cyclopentadienyl)zirconiumbis(p-toluenesulfonato),
Bis(cyclopentadienyl)zirconiumbis (trifluoromethanesulfonato),
Bis(methylcyclopentadienyl)zirconiumbis (trifluoromethanesulfonato),
Bis(ethylcyclopentadienyl)zirconiumbis (trifluoromethanesulfonato),
Bis(propylcyclopentadienyl)zirconiumbis (trifluoromethanesulfonato),
Bis(butylcyclopentadienyl)zirconiumbis (trifluoromethanesulfonato),
Bis(hexylcyclopentadienyl)zirconiumbis (trifluoromethanesulfonato),
Bis(1,3-dimethylcyclopentadienyl)zirconiumbis (trifluoromethanesulfonato),
Bis(1-methyl-3-ethylcyclopentadienyl)zirconiumbis (trifluoromethanesulfonato),
Bis(1-methyl-3-propylcyclopentadienyl)zirconiumbis (trifluoromethanesulfonato),
Bis(1-methyl-3-butylcyclopentadienyl)zirconiumbis (trifluoromethanesulfonato),
Bis(1,3-dimethylcyclopentadienyl)zirconium dichloride,
Bis(1-methyl-3-ethylcyclopentadienyl)zirconium dichloride,
Bis(1-methyl-3-propylcyclopentadienyl)zirconium dichloride,
Bis(1-methyl-3-butylcyclopentadienyl)zirconium dichloride,
Bis(1-methyl-3-hexylcyclopentadienyl)zirconium dichloride,
Bis(1-methyl-3-octylcyclopentadienyl)zirconium dichloride,
Bis(1-ethyl-3-butylcyclopentadienyl)zirconium dichloride,
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(methylbenzylcyclopentadienyl)zirconium dichloride,
Bis(ethylhexylcyclopentadienyl)zirconium dichloride, and
Bis(methylcyclohexylcyclopentadienyl)zirconium dichloride.

Also employable in the invention are those compounds wherein the 1,3-position substituted cyclopentadienyl group is replaced with a 1,2-position substituted cyclopentadienyl group.

Other examples are bridge type metallocene compounds of the above formula (II) wherein at least two of R$^2$, R$^3$, R$^4$ and R⁵, e.g., R² and R³, are groups (ligands) having a cyclopentadienyl skeleton, and the at least two groups are bonded to each other through an alkylene group, a substituted alkylene group, a silylene group or a substituted silylene group. In these compounds, R⁴ and R⁵ are each independently the same as L other than the ligand having a cyclopentadienyl skeleton, as described in the formula (I).

Listed below are examples of such bridge type metallocene compounds.

Ethylenebis(indenyl)dimethylzirconium,
Ethylenebis(indenyl)zirconium dichloride,
Ethylenebis(indenyl)zirconiumbis(trifluoromethanesulfonato),
Ethylenebis(indenyl)zirconiumbis(methanesulfonato),
Ethylenebis(indenyl)zirconiumbis(p-toluenesulfonato),
Ethylenebis(indenyl)zirconiumbis(p-chlorobenzenesulfonato),
Ethylenebis(4,5,6,7-tetrahydroindenyl)zirconium dichloride,
Isopropylidene(cyclopentadienyl-fluorenyl)zirconium dichloride,
Isopropylidene(cyclopentadienylmethylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl) zirconium dichloride,
Dimethylsilylenebis(trimethylcyclopentadienyl) zirconium dichloride,
Dimethylsilylenebis(indenyl)zirconium dichloride,
Dimethylsilylenebis(indenyl)zirconiumbis(trifluoromethanesulfonato),
Dimethylsilylenebis(4,5,6,7-tetrahydroindenyl)zirconium dichloride,
Dimethylsilylenebis(cyclopentadienylfluorenyl) zirconium dichloride,
Diphenylsilylenebis(indenyl)zirconium dichloride, and
Methylphenylsilylenebis(indenyl)zirconium dichloride.

Further, a metallocene compound of the following formula (A-1), which is described in Japanese Patent Laid-Open Publication No. 268307/1992, is also employable.

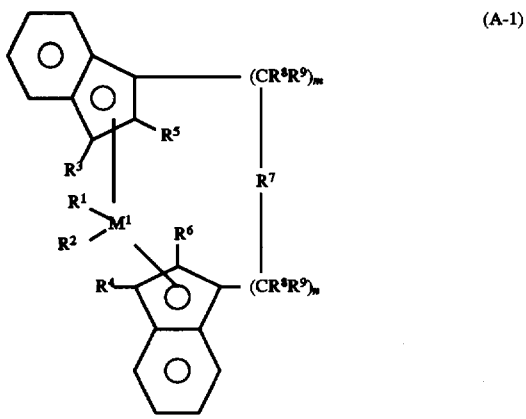

(A-1)

In the formula (A-1), M¹ is a metal of Group IVb or Vb, VIb of the periodic table, e.g., titanium, zirconium or hafnium.

R¹ and R² may be the same or different, and are each hydrogen, an alkyl group of 1 to 10, preferably 1 to 3 carbon atoms, an alkoxy group of 1 to 10, preferably 1 to 3 carbon atoms, an aryl group of 6 to 10, preferably 6 to 8 carbon atoms, an aryloxy group of 6 to 10, preferably 6 to 8 carbon atoms, an alkenyl group of 2 to 10, preferably 2 to 4 carbon atoms, an arylalkyl group of 7 to 40, preferably 7 to 10 carbon atoms, an alkylaryl group of 7 to 40, preferably 7 to 12 carbon atoms, an arylalkenyl group of 8 to 40, preferably 8 to 12 carbon atoms, or a halogen atom, preferably chlorine.

$R^3$ and $R^4$ may be the same or different, and are each hydrogen, a halogen atom, preferably fluorine, chlorine or bromine, an alkyl group of 1 to 10, preferably 1 to 4 carbon atoms which may be halogenated, an aryl group of 6 to 10, preferably 6 to 8 carbon atoms, or a group of $-NR^{10}_2$, $-SR^{10}$, $-OSiR^{10}_3$, $-SiR^{10}_3$ or $-PR^{10}_2$, where $R^{10}$ is a halogen atom, preferably chlorine, an alkyl group of 1 to 10, preferably 1 to 3 carbon atoms, or an aryl group of 6 to 10, preferably 6 to 8 carbon atoms.

$R^3$ and $R^4$ are each particularly preferably hydrogen.

$R^5$ and $R^6$ may be the same or different, preferably the same, and have the same meanings as described for $R^3$ and $R^4$ with the proviso that each of $R^5$ and $R^6$ is not hydrogen. $R^5$ and $R^6$ are each preferably an alkyl group of 1 to 4 carbon atoms which may be halogenated, for example, methyl, ethyl, propyl, isopropyl, butyl, isobutyl or trifluoromethyl, preferably methyl.

$R^7$ is

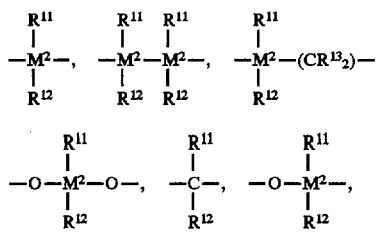

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$, where $R^{11}$, $R^{12}$ and $R^{13}$ may be the same or different, and are each hydrogen, a halogen atom, an alkyl group of 1 to 10, preferably 1 to 4 carbon atoms, more preferably methyl, a fluoroalkyl group of 1 to 10 carbon atoms, preferably $CF_3$, an aryl group of 6 to 10, preferably 6 to 8 carbon atoms, a fluoroaryl group of 6 to 10 carbon atoms, preferably pentafluorophenyl, an alkoxy group of 1 to 10, preferably 1 to 4 carbon atoms, particularly preferably methoxy, an alkenyl group of 2 to 10, preferably 2 to 4 carbon atoms, an arylalkyl group of 7 to 40, preferably 7 to 10 carbon atoms, an arylalkenyl group of 8 to 40, preferably 8 to 12 carbon atoms, or an alkylaryl group of 7 to 40, preferably 7 to 12 carbon atoms, or $R^{11}$ and $R^{12}$, or $R^{11}$ and $R^{13}$ may form together with the carbon atoms to which they are bonded a ring.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same or different, and have the same meaning as described for $R^{11}$.

m and n may be the same or different, and are each 0, 1 or 2, preferably 0 or 1, and m+n is 0, 1 or 2, preferably 0 or 1.

Particularly preferred metallocene compounds satisfying the above conditions are compounds represented by the following formulas (i) to (iii).

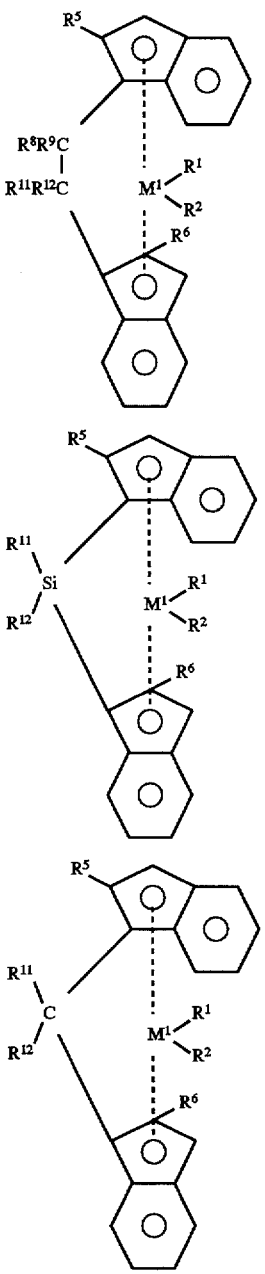

(i)

(ii)

(iii)

In the above formulas (i), (ii) and (iii), M¹ is Zr or Hf, R¹ and R² are each methyl or chloridne, R⁵ and R⁶ are each methyl, ethyl or trifluoromethyl, and R⁸, R⁹, R¹¹ and R¹² have the same meanings as described above.

Of the compounds represented by the formulas (i), (ii) and (iii), particularly preferred are the following compounds:

rac-ethylene(2-methyl-1-indenyl)₂-zirconium dichloride, rac-dimethylsilylene(2-methyl-1-indenyl)₂-zirconium dichloride, rac-dimethylsilylene(2-methyl-1-indenyl)₂-zirconium dimethyl, rac-ethylene(2-methyl-1-indenyl)₂-zirconium dimethyl, rac-phenyl(methyl)silylene-(2-methyl-1-indenyl)₂-zirconium dichloride, rac-diphenyl-silylene-(2-methyl-1-indenyl)₂-zirconium dichloride, rac-methylethylene(2-ethyl-1-indenyl)₂-zirconium dichloride, and rac-dimethylsilylene(2-ethyl-1-indenyl)₂-zirconium dichloride.

These metallocene compounds can be prepared by conventionally known processes (see, for example, Japanese Patent Laid-Open Publication No. 268307/1992).

In the present invention, a transition metal compound (metallocene compound) represented by the following formula (A-2) is also employable.

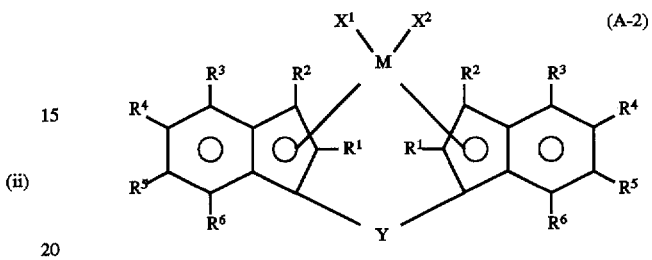

(A-2)

In the formula (A-2), M is a transition metal atom of Group IVa, Va or VIa of the periodic table, specifically, titanium, zirconium or hafnium.

R¹ and R² are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include the above-exemplified hydrocarbon groups which are substituted with halogen atoms.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsililphenyl.

Examples of the oxygen-containing groups include hydroxy groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing group.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms (methyl, ethyl or propyl). $R^2$ is preferably hydrogen or a hydrocarbon group, particularly preferably hydrogen or a hydrocarbon group of 1 to 3 carbon atoms (methyl, ethyl or propyl).

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, preferred is hydrogen, the hydrocarbon group or the halogenated hydrocarbon group. At least one combination of $R^3$ and $R^4$, $R^4$ and $R^5$, or $R^5$ and $R^6$ may form together with the carbon atoms to which they are bonded a monocyclic aromatic ring.

When there are two or more hydrocarbon groups or halogenated hydrocarbon groups, excluding the groups for forming the aromatic ring, they may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are those described for $R^1$ and $R^2$.

As the ligand which contains a monocyclic aromatic ring formed by at least one combination of $R^3$ and $R^4$, $R^4$ and $R^5$, or $R^5$ and $R^6$, as mentioned above, and is coordinated to M, there can be mentioned the following ones.

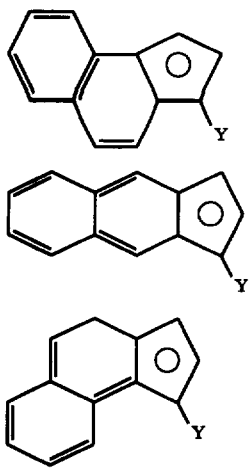

Of these, preferred is the ligand represented by the formula (1).

The aromatic ring mentioned above may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms for substituting the aromatic ring are those described for $R^1$ and $R^2$.

$X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are those described for $R^1$ and $R^2$.

Examples of the sulfur-containing groups include those described for $R^1$ and $R^2$; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$—, where $R^7$ is hydrogen, a halogen atom, a hydrocarbon group of 1 to 20 carbon atoms or a halogenated hydrocarbon group of 1 to 20 carbon atoms.

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene.

Examples of the divalent halogenated hydrocarbon groups include the above-mentioned divalent hydrocarbon groups of 1 to 20 carbon atoms, which are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-mentioned divalent silicon-containing groups.

Examples of the divalent tin-containing groups include those wherein silicon is replaced with tin in the above-mentioned divalent silicon-containing groups.

$R^7$ is a halogen atom, a hydrocarbon group of 1 to 20 carbon atoms or a halogenated hydrocarbon group of 1 to 20 carbon atoms, examples of which are those described for $R^1$ and $R^2$.

Of the above groups, preferred are divalent silicon-containing groups, divalent germanium-containing groups and divalent tin-containing group, and more preferred are divalent silicon-containing groups. Of these, particularly preferred are alkylsilylene, alkylarylsilylene and arylsilylene.

Listed below are examples of the transition metal compounds represented by the formula (A-2).

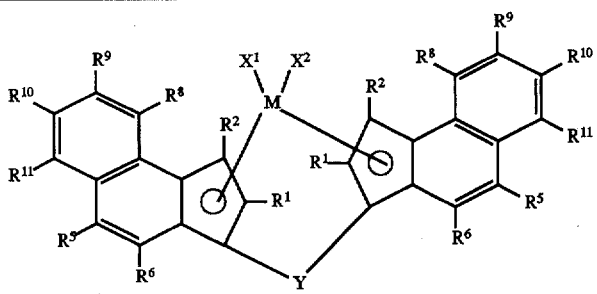

| R¹ | R² | R⁵ | R⁶ | R⁸ | R⁹ | R¹⁰ | R¹¹ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiMePh | Cl | Cl | Zr |
| CH₃ | H | H | H | H | H | H | H | SiPh₂ | Cl | Cl | Zr |
| CH₃ | H | H | H | H | H | H | H | Si(pMePh)₂ | Cl | CL | Zr |
| CH₃ | H | H | H | H | H | H | H | Si(pClPh)₂ | Cl | Cl | Zr |
| CH₃ | H | H | H | H | H | H | H | C₂H₄ | Cl | Cl | Zr |
| CH₃ | H | H | H | H | H | H | H | GeMe₂ | Cl | Cl | Zr |
| CH₃ | H | H | H | H | H | H | H | SnMe₂ | Cl | Cl | Zr |
| CH₃ | H | H | H | H | H | H | H | SiMe₂ | Br | Br | Zr |
| CH₃ | H | H | H | H | H | H | H | SiMe₂ | Cl | OSO₂CH₃ | Zr |
| CH₃ | H | H | H | H | H | H | H | SiMe₂ | Cl | SO₂CH₃ | Zr |
| CH₃ | H | H | H | H | H | H | H | SiMe₂ | Cl | Cl | Ti |
| CH₃ | H | H | H | H | H | H | H | SiMe₂ | Cl | Cl | Hf |
| C₂H₅ | H | H | H | H | H | H | H | SiMe₂ | Cl | Cl | Zr |
| nC₃H₇ | H | H | H | H | H | H | H | SiMe₂ | Cl | Cl | Zr |
| C₆H₅ | H | H | H | H | H | H | H | SiMe₂ | Cl | Cl | Zr |
| CH₃ | CH₃ | H | H | H | H | H | H | SiMe₂ | Cl | Cl | Zr |
| CH₃ | CH₃ | H | H | H | H | H | H | SiPh₂ | Cl | Cl | Zr |
| CH₃ | CH₃ | CH₃ | H | H | H | H | H | SiMe₂ | Cl | Cl | Zr |
| CH₃ | H | Cl | H | H | H | H | H | SiMe₂ | Cl | Cl | Zr |
| CH₃ | H | CH₃ | H | H | H | H | H | SiMe₂ | Cl | Cl | Zr |
| CH₃ | H | C₂H₅ | H | H | H | H | H | SiMe₂ | Cl | Cl | Zr |
| CH₃ | H | C₆H₅ | H | H | H | H | H | SiMe₂ | Cl | Cl | Zr |
| CH₃ | H | H | CH₃ | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*¹ | CH₃ | H | H | H | CH₂*¹ | SiMe₂ | Cl | Cl | Zr |
| CH₃ | H | H | H | H | H | H | C₆H₅ | SiMe₂ | Cl | Cl | Zr |

*¹: R⁵ and R¹¹ are bonded to each other to form a five-membered ring.
Me: methyl; Et: ethyl; Ph: phenyl.

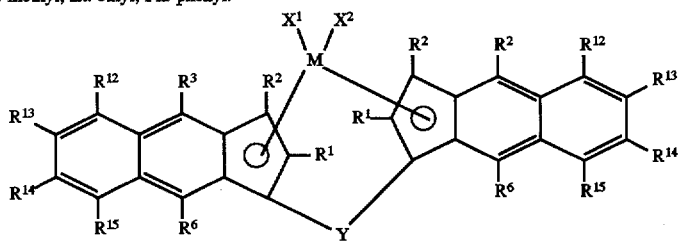

| R¹ | R² | R³ | R⁸ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²: R³ and R¹², and R⁶ and R¹⁵ are bonded to each other to form a five-membered ring, respectively.
Me: methyl; Ph: phenyl -continued

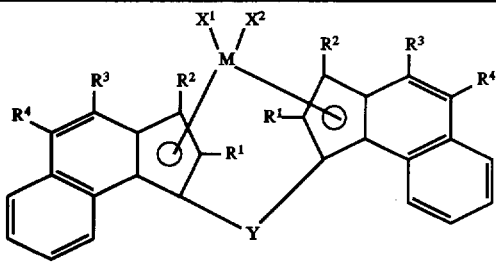

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |
| CH₃ | CH₃ | H | CH₃ | SiMe₂ | Cl | Cl | Zr |
| CH₃ | CH₃ | CH₃ | CH₃ | SiMe₂ | Cl | Cl | Zr |

Me: methyl.

Also employable in the invention are transition metal compounds wherein zirconium is replaced with titanium or hafnium in the above-mentioned compounds.

The transition metal compounds mentioned above are used generally in the form of racemic modification as the olefin polymerization catalyst component, but they can be used also in the form of R type or S type.

The indene derivative ligands for the transition metal compounds can be synthesized in accordance with ordinary organic synthesis through, for example, the reaction route described below.

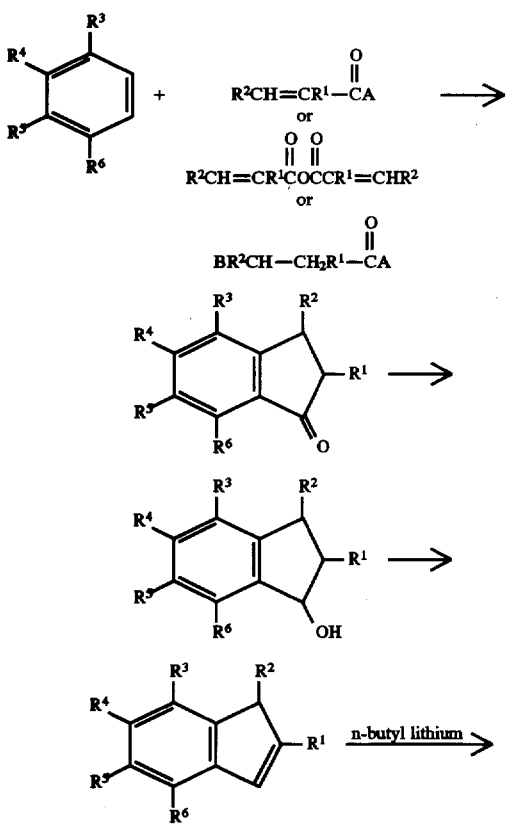

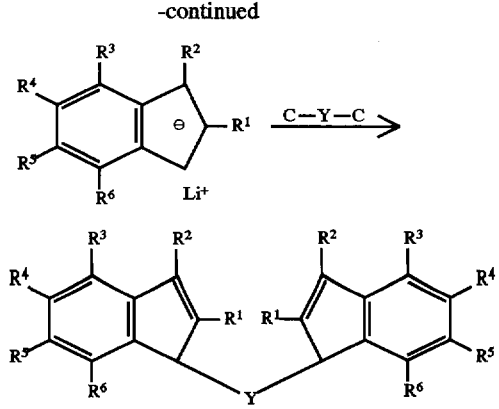

wherein A, B, and C are each a halogen atom.

The transition metal compounds used in the invention can be synthesized from these indene derivatives in accordance with conventionally known processes, for example, described in Japanese Patent Laid-Open Publication No. 268307/1992.

In the present invention, a transition metal compound (metallocene compound) represented by the following formula (A-3) is also employable.

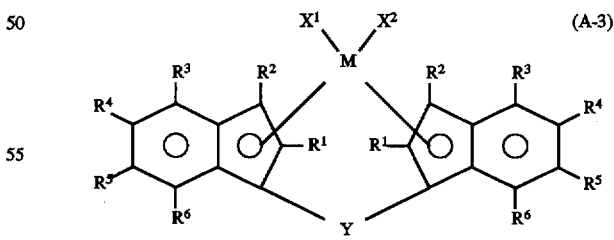

(A-3)

In the formula (A-3), M, R¹, R², R³, R⁴, R⁵ and R⁶ have the same meanings described for those in the aforesaid formula (A-2).

Of these groups R³, R⁴, R⁵ and R⁶, at least two groups including R³ are preferably alkyl groups, and it is more preferred that R³ and R⁵, or R³ and R⁶ are alkyl groups. These alkyl groups are preferably secondary or tertiary alkyl groups, and may be substituted with halogen atoms or silicon-containing groups. As the halogen atoms and the silicon-containing groups, there can be mentioned those substituents as described for $R^1$ and $R^2$.

Of these groups $R^3$, $R^4$, $R^5$ and $R^6$, other groups than the alkyl groups are each preferably hydrogen.

Examples of the hydrocarbon groups of 1 to 20 carbon atoms include straight chain and branched chain alkyl groups and cyclic alkyl groups, such as methyl, ethyl, n-propyl, i-propyl, n-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from the groups of $R^3$, $R^4$, $R^5$ and $R^6$ may be bonded to each other to form a monocyclic or polycyclic hydrocarbon ring other than the aromatic ring.

Examples of the halogen atoms are those described for $R^1$ and $R^2$.

$X^1$, $X^2$, Y and $R^7$ have the same meanings described for those in the aforesaid formula (A-2).

Listed below are examples of the metallocene compounds (transition metal compounds) represented by the formula (A-3).

rac-Dimethylsilylene-bis(4,7-dimethyl-1-indenyl)zirconium dichloride,
rac-Dimethylsilylene-bis(2,4,7-trimethyl-1-indenyl)zirconium dichloride,
rac-Dimethylsilylene-bis(2,4,6-trimethyl-1-indenyl)zirconium dichloride,
rac-Dimethylsilylene-bis(2,5,6-trimethyl-1-indenyl)zirconium dichloride,
rac-Dimethylsilylene-bis(2,4,5,6-tetramethyl-1-indenyl)zirconium dichloride,
rac-Dimethylsilylene-bis(2,4,5,6,7-pentamethyl-1-indenyl)zirconium dichloride,
rac-Dimethylsilylene-bis(2-methyl-4-n-propyl-7-methyl-1-indenyl)zirconium dichloride,
rac-Dimethylsilylene-bis(4-i-propyl-7-methyl-1-indenyl)zirconium dichloride,
rac-Dimethylsilylene-bis(2-methyl-4-i-propyl-7-methyl-1-indenyl)zirconium dichloride,
rac-Dimethylsilylene-bis(2-methyl-4-i-propyl-6-methyl-1-indenyl)zirconium dichloride,
rac-Dimethylsilylene-bis(2-methyl-4-methyl-6-i-propyl-1-indenyl)zirconium dichloride,
rac-Dimethylsilylene-bis(2-methyl-4-i-propyl-5-methyl-1-indenyl)zirconium dichloride,
rac-Dimethylsilylene-bis(2-methyl-4,6-di(i-propyl)-1-indenyl)zirconium dichloride,
rac-Dimethylsilylene-bis(2-methyl-4,6-di(i-propyl)-7-methyl-1-indenyl)zirconium dichloride,
rac-Dimethylsilylene-bis(2-methyl-4-i-butyl-7-methyl-1-indenyl)zirconium dichloride,
rac-Dimethylsilylene-bis(2-methyl-4-sec-butyl-7-methyl-1-indenyl)zirconium dichloride,
rac-Dimethylsilylene-bis(2-methyl-4,6-di(sec-butyl)-1-indenyl)zirconium dichloride,
rac-Dimethylsilylene-bis(2-methyl-4-tert-butyl-7-methyl-1-indenyl)zirconium dichloride,
rac-Dimethylsilylene-bis(2-methyl-4-cyclohexyl-7-methyl-1-indenyl)zirconium dichloride,
rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichloride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl)zirconium dichloride,
rac-Di(cyclohexyl)silylene-bis(2-methyl-4-i-propyl-7-methyl-1-indenyl)zirconium dichloride,
rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1-indenyl)zirconium dichloride,
rac-Diphenylsilylene-bis(2-methyl-4-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl-4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-6-methyl-1-indenyl)zirconium dichloride,
rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl-1-indenyl)zirconium dichloride.

Also employable in the invention are transition metal compounds wherein zirconium is replaced with titanium metal or hafnium in the above-mentioned compounds.

The transition metal compounds mentioned above are used generally in the form of racemic modification, but they can be used also in the form of R type or S type.

The indene derivative ligands for the transition metal compounds can be synthesized in accordance with ordinary organic synthesis through, for example, the aforementioned reaction route.

The transition metal compounds (metallocene compounds) represented by the formula (A-3) can be synthesized from these indene derivatives in accordance with conventionally known processes, for example, described in Japanese Patent Laid-Open Publication No. 268307/1992.

In the present invention, a transition metal compound (metallocene compound) represented by the following formula (A-4) is also employable.

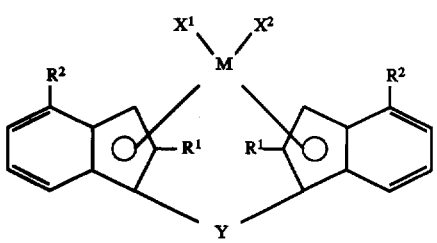

(A-4)

In the formula (A-4), M, $R^1$, $X^1$, $X^2$ and Y have the same meanings as described for those in the aforesaid formula (A-2) or (A-3).

$R^1$ is preferably a hydrocarbon group, more preferably a hydrocarbon group of 1 to 4 carbon atoms, e.g., methyl, ethyl, propyl and butyl.

$X^1$ and $X^2$ are each preferably a halogen atom or a hydrocarbon group of 1 to 20 carbon atoms.

$R^2$ is an aryl group of 6 to 16 carbon atoms, for example, phenyl, α-naphthyl, β-naphthyl, anthracenyl, phenanthryl, pyrenyl, acenaphthyl, perinaphthenyl (phenalenyl) or aceanthrylenyl. Of these, phenyl or naphthyl is preferred. These aryl groups may be substituted with halogen atoms, hydrocarbon groups of 1 to 20 carbon atoms or halogenated hydrocarbon groups of 1 to 20 carbon atoms such as described for $R^1$.

Listed below are examples of the transition metal compounds (metallocene compounds) represented by the formula (A-4).

rac-Dimethylsilylene-bis(4-phenyl-1-indenyl)zirconium dichloride, rac-Dimethylsilylene-bis(2-methyl-4-phenyl-1-indenyl) zirconium dichloride, rac-Dimethylsilylene-bis(2-methyl-4-(α-naphthyl)-1-indenyl)zirconium dichloride, rac-Dimethylsilylene-bis(2-methyl-4-(β-naphthyl)-1-indenyl)zirconium dichloride, rac-Dimethylsilylene-bis(2-methyl-4-(1-anthracenyl)-1-indenyl)zirconium dichloride, rac-Dimethylsilylene-bis(2-methyl-4-(2-anthracenyl)-1-indenyl)zirconium dichloride, rac-Dimethylsilylene-bis(2-methyl-4-(9-anthracenyl)-1-indenyl)zirconium dichloride, rac-Dimethylsilylene-bis(2-methyl-4-(9-phenanthryl)-1-indenyl)zirconium dichloride, rac-Dimethylsilylene-bis(2-methyl-4-(p-fluorophenyl)-1-indenyl)zirconium dichloride, rac-Dimethylsilylene-bis(2-methyl-4-(pentafluorophenyl)-1-indenyl)zirconium dichloride, rac-Dimethylsilylene-bis(2-methyl-4-(p-chlorophenyl)-1-indenyl)zirconium dichloride, rac-Dimethylsilylene-bis(2-methyl-4-(m-chlorophenyl)-1-indenyl)zirconium dichloride, rac-Dimethylsilylene-bis(2-methyl-4-(o-chlorophenyl)-1-indenyl)zirconium dichloride, rac-Dimethylsilylene-bis(2-methyl-4-(o,p-dichlorophenyl)phenyl-1-indenyl) zirconium dichloride, rac-Dimethylsilylene-bis(2-methyl-4-(p-bromophenyl)-1-indenyl)zirconium dichloride, rac-Dimethylsilylene-bis(2-methyl-4-(p-tolyl)-1-indenyl) zirconium dichloride, rac-Dimethylsilylene-bis(2-methyl-4-(m-tolyl)-1-indenyl)zirconium dichloride, rac-Dimethylsilylene-bis(2-methyl-4-(o-tolyl)-1-indenyl) zirconium dichloride, rac-Dimethylsilylene-bis(2-methyl-4-(o,o'-dimethylphenyl)-1-indenyl)zirconium dichloride, rac-Dimethylsilylene-bis(2-methyl-4-(p-ethylphenyl)-1-indenyl)zirconium dichloride, rac-Dimethylsilylene-bis(2-methyl-4-(p-i-propylphenyl)-1-indenyl)zirconium dichloride, rac-Dimethylsilylene-bis(2-methyl-4-(p-benzylphenyl)-1-indenyl)zirconium dichloride, rac-Dimethylsilylene-bis(2-methyl-4-(p-biphenyl)-1-indenyl)zirconium dichloride, rac-Dimethylsilylene-bis(2-methyl-4-(m-biphenyl)-1-indenyl)zirconium dichloride, rac-Dimethylsilylene-bis(2-methyl-4-(p-trimethylsilylphenyl)-1-indenyl)zirconium dichloride, rac-Dimethylsilylene-bis(2-methyl-4-(m-trimethylsilylphenyl)-1-indenyl)zirconium dichloride, rac-Dimethylsilylene-bis(2-ethyl-4-phenyl-1-indenyl) zirconium dichloride, rac-Diphenylsilylene-bis(2-ethyl-4-phenyl-1-indenyl) zirconium dichloride, rac-Dimethylsilylene-bis(2-phenyl-4-phenyl-1-indenyl) zirconium dichloride, rac-Dimethylsilylene-bis(2-n-propyl-4-phenyl-1-indenyl) zirconium dichloride, rac-Diethylsilylene-bis(2-methyl-4-phenyl-1-indenyl) zirconium dichloride, rac-Di-(i-propyl)silylene-bis(2-methyl-4-phenyl-1-indenyl)zirconium dichloride, rac-Di-(n-butyl)silylene-bis(2-methyl-4-phenyl-1-indenyl)zirconium dichloride, rac-Dicyclohexylsilylene-bis(2-methyl-4-phenyl-1-indenyl)zirconium dichloride, rac-Methylphenylsilylene-bis(2-methyl-4-phenyl-1-indenyl)zirconium dichloride, rac-Diphenylsilylene-bis(2-methyl-4-phenyl-1-indenyl) zirconium dichloride, rac-Di(p-tolyl)silylene-bis(2-methyl-4-phenyl-1-indenyl) zirconium dichloride, rac-Di(p-chlorophenyl)silylene-bis(2-methyl-4-phenyl-1-indenyl)zirconium dichloride, rac-Methylene-bis(2-methyl-4-phenyl-1-indenyl) zirconium dichloride, rac-Ethylene-bis(2-methyl-4-phenyl-1-indenyl)zirconium dichloride, rac-Dimethylgermylene-bis(2-methyl-4-phenyl-1-indenyl)zirconium dichloride, rac-Dimethylstannylene-bis(2-methyl-4-phenyl-1-indenyl)zirconium dichloride, rac-Dimethylsilylene-bis(2-methyl-4-phenyl-1-indenyl) zirconium dibromide, rac-Dimethylsilylene-bis(2-methyl-4-phenyl-1-indenyl) zirconium dimethyl, rac-Dimethylsilylene-bis(2-methyl-4-phenyl-1-indenyl) zirconium methylchloride, rac-Dimethylsilylene-bis(2-methyl-4-phenyl-1-indenyl) zirconium chloride $SO_2Me$, and rac-Dimethylsilylene-bis(2-methyl-4-phenyl-1-indenyl) zirconium chloride $OSO_2Me$.

Also employable in the invention are transition metal compounds wherein zirconium is replaced with titanium or hafnium in the above-mentioned compounds.

The transition metal compounds represented by the formula (A-4) can be prepared in accordance with "Journal of Organometallic Chem.", 288(1985), pp. 63–67, and European Patent Publication No. 0,320,762 (specification and examples), for example, in the following manner.

$2H_2R^a + 2\text{Butyl-Li} \longrightarrow 2HR^aLi \xrightarrow{Z-Y-Z}$

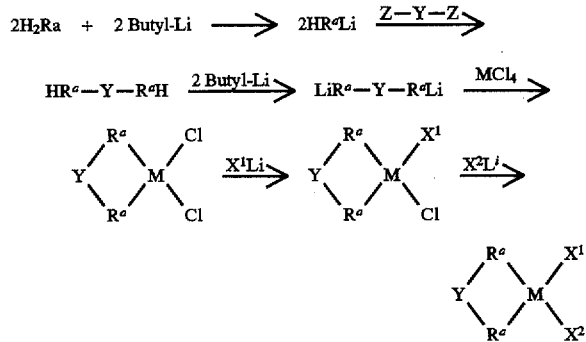

wherein Z is Cl, Br, I or an o-tosyl group, and $H_2R^a$ represents

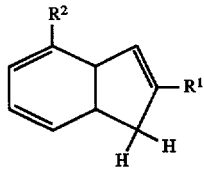

where $R^1$ is hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group; and $R^2$ is an aryl group of 6 to 16 carbon atoms, for example, phenyl, α-naphthyl, β-naphthyl, anthracenyl, phenanthryl, pyrenyl, acenaphthyl, perinaphthenyl (phenalenyl) or aceanthrylenyl.

The transition metal compounds (A-4) are used generally in the form of racemic modification, but they can be used also in the form of R type or S type.

In the present invention, a compound represented by the following formula (A-5a) can be also employed as the metallocene compound.

$$L^aMX_2 \qquad (A\text{-}5a)$$

wherein, M is a metal of Group IV of the periodic table or a metal of lanthanide series;

$L^a$ is a derivative of delocalization π bond group and imparts restraint geometrical shape to the metal M active site; and the X's are each independently hydrogen, halogen, a hydrocarbon group of 20 or less carbon, silicon or germanium atoms, a silyl group or a germyl group.

Of the compounds of the formula (A-5a), preferred are compounds represented by the following formula (A-5b).

wherein M is titanium, zirconium or hafnium; X is the same as described above;

Cp is a substituted cyclopentadienyl group which is π-bonded to M and has a substituent Z, or a derivative thereof:

Z is oxygen, sulfur, boron or an element of Group IVA of the periodic table (e.g., silicon, germanium or tin);

Y is a ligand containing nitrogen, phosphorus, oxygen or sulfur; and

Z and Y may together form a condensed ring.

Listed below are examples of the compounds represented by the formula (A-5b).

(Dimethyl(t-butylamide)(tetramethyl-η⁵-cyclopentadienyl)silane)titanium dichloride, ((t-Butylamide)(tetramethyl-η⁵-cyclopentadienyl)-1,2-ethanediyl)titanium dichloride, (Dibenzyl(t-butylamide)(tetramethyl-η⁵-cyclopentadienyl)silane)titanium dichloride, (Dimethyl(t-butylamide)(tetramethyl-η⁵-cyclopentadienyl)silane)dibenzyltitanium, (Dimethyl(t-butylamide)(tetramethyl-η⁵-cyclopentadienyl)silane)dimethyltitanium, ((t-Butylamide)(tetramethyl-η₅-cyclopentadienyl)-1,2-ethanediyl)dibenzyltitanium, ((Methylamide)(tetramethyl-η⁵-cyclopentadienyl)-1,2-ethanediyl)dineopentyltitanium, ((Phenylphosphide)(tetramethyl-η⁵-cyclopentadienyl)methylene)diphenyltitanium, (Dibenzyl(t-butylamide)(tetramethyl-η⁵-cyclopentadienyl)silane)dibenzyltitanium, (Dimethyl(benzylamide)(η⁵-cyclopentadienyl)silane)di(trimethylsilyl)titanium, (Dimethyl(phenylphosphide)-(tetramethyl-η⁵-cyclopentadienyl)silane)dibenzyltitanium, (Tetramethyl-η⁵-cyclopentadienyl)-1,2-ethanediyl)dibenzyltitanium, (2-η⁵-(Tetramethyl-cyclopentadienyl)-1-methylethanolate (2-))dibenzyltitanium, (2-η⁵-(Tetramethyl-cyclopentadienyl)-1-methylethanolate (2-))dimethyltitanium, (2-((4a,4b,8a,9,9a-η)-9H-fluorene-9-yl)cyclohexanolate (2-))dimethyltitanium, and (2-((4a,4b,8a,9,9a-η)-9H-fluorene-9-yl)cyclohexanolate (2-))dibenzyltitanium.

In the present invention, the metallocene compounds mentioned above can be used in combination of two or more kinds.

Some examples of titanium compounds are mentioned above as the metallocene compounds, but compounds wherein titanium is replaced with zirconium or hafnium in the above-mentioned titanium compounds can be also exemplified.

Those compounds may be used alone or in combination of two or more kinds.

As the metallocene compounds (A-5a) and (A-5b), zirconocene compounds which have zirconium as the central metal atom and have at least two ligands containing a cyclopentadienyl skeleton. In the metallocene compounds, the central metal atom is preferably titanium.

In the invention, a compound represented by the following formula (III) or (IV) of the above-mentioned metallocene compound is preferably used from the viewpoints of the controllability of a proportion of long-chain branches over a wide range, the polymerization activity, the conversion ratio of an α-olefin, the molecular weight and random copolymerizability of a produced polymer and the polymerization conditions such as a polymerization temperature.

The metallocene compounds represented by the formula (III) are partly the compound represented by formula (A-3).

The metallocene represented by the formula (IV) are partly the compounds represented by the formula (A-2).

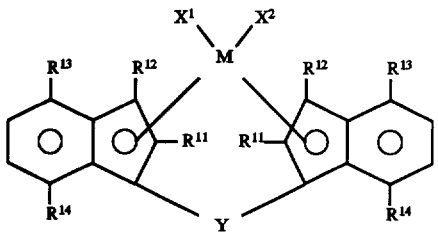

(III)

In the formula (III), M is a transition metal atom of Group IVB of the periodic table, specifically zirconium, titanium or hafnium, preferably zirconium.

$R^{11}$ and $R^{12}$ $R^{11}$ and $R^{12}$ may be the same as or different from each other, and are each hydrogen, a halogen atom, a hydrocarbon group of 1 to 20 carbon atoms which may be halogenated, a silicon-containing group, an oxygen-containing group, a sulfur-containing group, a nitrogen-containing group or a phosphorus-containing group.

Examples of the hydrocarbon groups of 1 to 20 carbon atoms include:

alkyl groups, such as methyl, ethyl, propyl, n-butyl, isobutyl, sec-butyl, tert-butyl, pentyl, neopentyl, hexyl, cyclohexyl, octyl, nonyl, dodecyl, icosyl, norbornyl and adamantyl;

alkenyl groups, such as vinyl, propenyl and cyclohexenyl;

arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl.

These hydrocarbon groups may be substituted with halogen atoms such as fluorine, chlorine, bromine and iodine; and organosilyl groups such as trimethylsilyl, triethylsilyl and triphenylsilyl.

Examples of the oxygen-containing groups include hydroxyl groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents obtained by replacing oxygen with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

Examples of the nitrogen-containing groups include amino groups; alkylamino groups, such as methylamino, dimethylamino, diethylamino, dipropylamino and dibutylamino, dicyclohexylamino; arylamino groups, such as phenylamino, diphenylamino, ditolylamino and dinaphthylamino; and alkylarylamino groups such as methylphenylamino.

Examples of the phosphorus-containing groups include dimethylphosphino and diphenylphosphino.

Of these, preferred as $R^{11}$ is a hydrocarbon group, particularly a hydrocarbon group of 1 to 3 carbon atoms, i.e., methyl, ethyl or propyl.

Of these, preferred as $R^{12}$ is hydrogen or a hydrocarbon group, particularly hydrogen or a hydrocarbon group of 1 to 3 carbon atoms, i.e., methyl, ethyl or propyl.

$R^{13}$ and $R^{14}$ $R^{13}$ and $R^{14}$ are each an alkyl group of 1 to 20 carbon atoms, and examples thereof are those described above. $R^{13}$ is preferably a secondary or tertiary alkyl group. $R^{14}$ may contain a double bond or a triple bond.

$X^1$ and $X^2$ $X^1$ and $X^2$ may be the same as or different from each other, and are each hydrogen, a halogen atom, a hydrocarbon group of 1 to 20 carbon atoms, a halogenated hydrocarbon group of 1 to 20 carbon atoms, a silicon-containing group, an oxygen-containing group or a sulfur-containing group. Examples of these groups are identical with the groups described above for $R^{11}$. Of those groups, preferred is a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{15}$—, —P(R$^{15}$)—, —P(O)(R$^{15}$)—, —BR$^{15}$— or —AlR$^{15}$— (R$^{15}$ is hydrogen, a halogen atom, a hydrocarbon group of 1 to 20 carbon atoms which may be substituted with halogen, or an alkoxy group).

Particular examples of the above groups include:

divalent hydrocarbon groups of 1 to 20 carbon atoms, such as alkylene groups (e.g., methylene, dimethylmethylene, 1,2-ethylene, dimethyl-1,2-ethylene, 1,3-trimethylene, 1,4-tetramethylene, 1,2-cyclohexylene and 1,4-cyclohexylene), and arylalkylene groups (e.g., diphenylmethylene and diphenyl-1,2-ethylene);

divalent halogenated hydrocarbon groups obtained by halogenating the above-exemplified divalent hydrocarbon groups of 1 to 20 carbon atoms, such as chloromethylene;

divalent silicon-containing groups, such as alkylsilylene, alkylarylsilylene and arylsilylene groups (e.g., methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene), and alkyldisilyl, alkylaryldisilyl and aryldisilyl groups (e.g., tetramethyl-1,2-disilyl and tetraphenyl-1,2-disilyl); and divalent germanium-containing groups obtained by replacing silicon with germanium in the above-exemplified divalent silicon-containing groups.

$R^{15}$ is the same hydrogen, halogen atom, hydrocarbon group of 1 to 20 carbon atoms or halogenated hydrocarbon group of 1 to 20 carbon atoms as described above.

Of these, preferred are divalent silicon-containing groups and divalent germanium-containing groups. More preferred are divalent silicon-containing groups, and particularly preferred are alkylsilylene, alkylarylsilylene and arylsilylene.

Listed below are examples of the metallocene compounds represented by the above formula (III).

rac-Dimethylsilylene-bis{1-(2,7-dimethyl-4-ethylindenyl)}zirconium dichloride, rac-Dimethylsilylene-bis{1-(2,7-dimethyl-4-n-propylindenyl)}zirconium dichloride, rac-Dimethylsilylene-bis{1-(2,7-dimethyl-4-i-propylindenyl)}zirconium dichloride, rac-Dimethylsilylene-bis{1-(2,7-dimethyl-4-n-butylindenyl)}zirconium dichloride,
rac-Dimethylsilylene-bis{1-(2,7-dimethyl-4-sec-butylindenyl)}zirconium dichloride,
rac-Dimethylsilylene-bis{1-(2,7-dimethyl-4-t-butylindenyl)}zirconium dichloride,
rac-Dimethylsilylene-bis{1-(2,7-dimethyl-4-n-pentylindenyl)}zirconium dichloride,
rac-Dimethylsilylene-bis{1-(2,7-dimethyl-4-n-hexylindenyl)}zirconium dichloride,
rac-Dimethylsilylene-bis{1-(2,7-dimethyl-4-cyclohexylindenyl)}zirconium dichloride,
rac-Dimethylsilylene-bis{1-(2,7-dimethyl-4-methylcyclohexylindenyl)}zirconium dichloride,
rac-Dimethylsilylene-bis{1-(2,7-dimethyl-4-phenylethylindenyl)}zirconium dichloride,
rac-Dimethylsilylene-bis{1-(2,7-dimethyl-4-phenyldichloromethylindenyl)}zirconium dichloride,
rac-Dimethylsilylene-bis{1-(2,7-dimethyl-4-chloromethylindenyl)}zirconium dichloride,
rac-Dimethylsilylene-bis{1-(2,7-dimethyl-4-trimethylsilylmethylindenyl)}zirconium dichloride,
rac-Dimethylsilylene-bis{1-(2,7-dimethyl-4-trimethylsiloxymethylindenyl)}zirconium dichloride,
rac-Diethylsilylene-bis{1-(2,7-dimethyl-4-i-propylindenyl)}zirconium dichloride,
rac-Di(i-propyl)silylene-bis{1-(2,7-dimethyl-4-i-propylindenyl)}zirconium dichloride,
rac-Di(n-butyl)silylene-bis{1-(2,7-dimethyl-4-i-propylindenyl)}zirconium dichloride,
rac-Di(cyclohexyl)silylene-bis{1-(2,7-dimethyl-4-i-propylindenyl)}zirconium dichloride,
rac-Methylphenylsilylene-bis{1-(2,7-dimethyl-4-i-propylindenyl)}zirconium dichloride,
rac-Methylphenylsilylene-bis{1-(2,7-dimethyl-4-t-butylindenyl)}zirconium dichloride,
rac-Diphenylsilylene-bis{1-(2,7-dimethyl-4-t-butylindenyl)}zirconium dichloride,
rac-Diphenylsilylene-bis{1-(2,7-dimethyl-4-i-propylindenyl)}zirconium dichloride,
rac-Diphenylsilylene-bis{1-(2,7-dimethyl-4-ethylindenyl)}zirconium dichloride,
rac-Di(p-tolyl)silylene-bis{1-(2,7-dimethyl-4-i-propylindenyl)}zirconium dichloride,
rac-Di(p-chlorophenyl)silylene-bis{1-(2,7-dimethyl-4-i-propylindenyl)}zirconium dichloride,
rac-Dimethylsilylene-bis{1-(2-methyl-4-i-propyl-7-ethylindenyl)}zirconium dichloride,
rac-Dimethylsilylene-bis{1-(2,3,7-trimethyl-4-ethylindenyl)}zirconium dichloride,
rac-Dimethylsilylene-bis{1-(2,3,7-trimethyl-4-n-propylindenyl)}zirconium dichloride,
rac-Dimethylsilylene-bis{1-(2,3,7-trimethyl-4-i-propylindenyl)}zirconium dichloride,
rac-Dimethylsilylene-bis{1-(2,3,7-trimethyl-4-n-butylindenyl)}zirconium dichloride,
rac-Dimethylsilylene-bis{1-(2,3,7-trimethyl-4-sec-butylindenyl)}zirconium dichloride,
rac-Dimethylsilylene-bis{1-(2,3,7-trimethyl-4-t-butylindenyl)}zirconium dichloride,
rac-Dimethylsilylene-bis{1-(2,3,7-trimethyl-4-n-pentylindenyl)}zirconium dichloride,
rac-Dimethylsilylene-bis{1-(2,3,7-trimethyl-4-n-hexylindenyl)}zirconium dichloride,
rac-Dimethylsilylene-bis{1-(2,3,7-trimethyl-4-cyclohexylindenyl)}zirconium dichloride,
rac-Dimethylsilylene-bis{1-(2,3,7-trimethyl-4-methylcyclohexylindenyl)}zirconium dichloride,
rac-Dimethylsilylene-bis{1-(2,3,7-trimethyl-4-trimethylsilylmethylindenyl)}zirconium dichloride,
rac-Dimethylsilylene-bis{1-(2,3,7-trimethyl-4-trimethylsiloxymethylindenyl)}zirconium dichloride,
rac-Dimethylsilylene-bis{1-(2,3,7-trimethyl-4-phenylethylindenyl)}zirconium dichloride,
rac-Dimethylsilylene-bis{1-(2,3,7-trimethyl-4-phenyldichloromethylindenyl)}zirconium dichloride,
rac-Dimethylsilylene-bis{1-(2,3,7-trimethyl-4-chloromethylindenyl)}zirconium dichloride,
rac-Diethylsilylene-bis{1-(2,3,7-trimethyl-4-i-propylindenyl)}zirconium dichloride,
rac-Di(i-propyl)silylene-bis{1-(2,3,7-trimethyl-4-i-propylindenyl)}zirconium dichloride,
rac-Di(n-butyl)silylene-bis{1-(2,3,7-trimethyl-4-i-propylindenyl)}zirconium dichloride,
rac-Di(cyclohexyl)silylene-bis{1-(2,3,7-trimethyl-4-i-propylindenyl)}zirconium dichloride,
rac-Methylphenylsilylene-bis{1-(2,3,7-trimethyl-4-i-propylindenyl)}zirconium dichloride,
rac-Methylphenylsilylene-bis{1-(2,3,7-trimethyl-4-t-butylindenyl)}zirconium dichloride,
rac-Diphenylsilylene-bis{1-(2,3,7-trimethyl-4-t-butylindenyl)}zirconium dichloride,
rac-Diphenylsilylene-bis{1-(2,3,7-trimethyl-4-i-propylindenyl)}zirconium dichloride,
rac-Diphenylsilylene-bis{1-(2,3,7-trimethyl-4-ethylindenyl)}zirconium dichloride,
rac-Di(p-tolyl)silylene-bis{1-(2,3,7-trimethyl-4-i-propylindenyl)}zirconium dichloride,
rac-Di(p-chlorophenyl)silylene-bis{1-(2,3,7-trimethyl-i-propylindenyl)}zirconium dichloride,
rac-Dimethylsilylene-bis{1-(2-methyl-4-i-propyl-7-methylindenyl)}zirconium dimethyl,
rac-Dimethylsilylene-bis{1-(2-methyl-4-i-propyl-7-methylindenyl)}zirconium methylchloride,
rac-Dimethylsilylene-bis{1-(2-methyl-4-i-propyl-7-methylindenyl)}zirconium-bis(methanesulfonato),
rac-Dimethylsilylene-bis{1-(2-methyl-4-i-propyl-7-methylindenyl)}zirconium-bis(p-phenylsulfinato),
rac-Dimethylsilylene-bis{1-(2-methyl-3-methyl-4-i-propyl-7-methylindenyl)}zirconium dichloride,
rac-Dimethylsilylene-bis{1-(2-ethyl-4-i-propyl-7-methylindenyl)}zirconium dichloride,
rac-Dimethylsilylene-bis{1-(2-phenyl-4-i-propyl-7-methylindenyl)}zirconium dichloride,
rac-Dimethylsilylene-bis{1-(2-methyl-4-i-propyl-7-methylindenyl)}titanium dichloride, and
rac-Dimethylsilylene-bis{1-(2-methyl-4-i-propyl-7-methylindenyl)}hafnium dichloride.

Of these, particularly preferred are compounds having a branched alkyl group such as i-propyl, sec-butyl or tert butyl at the 4-position.

In the invention, a racemic modification of the above-mentioned metallocene compound is generally used as the olefin polymerization catalyst component, but R type or S type is also employable.

The metallocene compounds can be prepared from indene derivatives by known processes, for example, a process described in Japanese Patent Laid-Open Publication No. 268307/1992.

In the invention, a compound represented by the following formula (IV), which is described in European Patent No. 549,900 and Canadian Patent No. 2,084,017, is also employable.

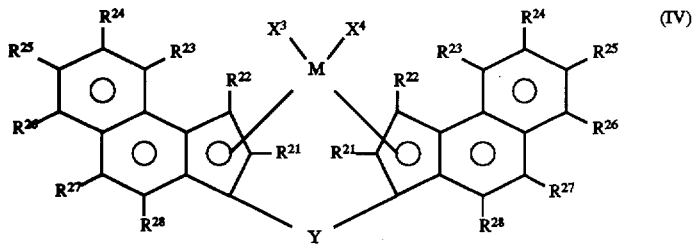

(IV)

In the formula (IV), M is a transition metal atom of Group IVB of the periodic table, specifically titanium, zirconium or hafnium, particularly preferably zirconium, The $R^{21}$'s may be the same as or different from each other, and are each hydrogen, a halogen atom, preferably fluorine and chlorine, an alkyl group of 1 to 10 carbon atoms preferably 1 to 4 carbon atoms which may be halogenated, an aryl group of 6 to 10 carbon atoms preferably 6 to 8 carbon atoms, $-NR_2$, $-SR$, $-OSiR_3$, $-SiR_3$ or $-PR_2$ (R is a halogen atom preferably chlorine, an alkyl group of 1 to 10 carbon atoms preferably 1 to 3 carbon atoms or an aryl group of 6 to 10 carbon atoms preferably 6 to 8 carbon atoms), $R^{22}$ to $R^{28}$ may be the same as or different from each other, and are each the same as $R^{21}$, or adjacent two of $R^{22}$ to $R^{28}$ may form an aromatic or aliphatic ring together with atoms bonded to them, and $X^3$ and $X^4$ may be the same as or different from each other, and are each hydrogen, a halogen atom, OH group, an alkyl group of 1 to 10 carbon atoms, preferably 1 to 3 carbon atoms; an alkoxy group of 1 to 10 carbon atoms, preferably 1 to 3 carbon atoms; an aryl group of 6 to 10 carbon atoms, preferably 6 to 8 carbon atoms; an aryloxy group of 6 to 10 carbon atoms, preferably 6 to 8 carbon atoms; an alkenyl group of 2 to 10 carbon atoms; preferably 2 to 4 carbon atoms; an arylalkyl group of 7 to 40 carbon atoms, preferably 7 to 10 carbon atoms; an alkylaryl group of 7 to 40 carbon atoms; preferably 7 to 12 carbon atoms; an arylalkenyl group of 8 to 40 carbon atoms, preferably 8 to 12 carbon atoms.

Z is

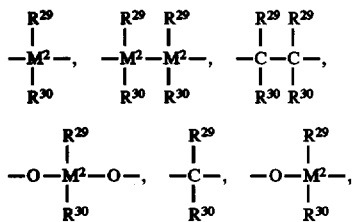

$=BR^{29}$, $=AlR^{29}$, $-Ge-$, $-Sn-$, $-O-$, $-S-$, $=SO$, $=SO_2$, $=NR^{29}$, $=CO$, $=PR^{29}$ or $=P(O)R^{29}$. $R^{29}$ and $R^{30}$ may be the same as or different from each other, and are each hydrogen, a halogen atom, an alkyl group of 1 to 10 carbon atom, preferably 1 to 4 carbon atoms, more preferably methyl group; a fluoroalkyl group of 1 to 10 carbon atoms, preferably $CF_3$ group; an aryl group of 6 to 10 carbon atom, preferably 6 to 8 carbon atoms; a fluoroaryl group of 6 to 10 carbon atoms, preferably pentafluorophenyl; an alkoxy group of 1 to 10 carbon atoms, preferably 1 to 4 carbon atoms, more preferably methoxy; an alkenyl group of 2 to 10 carbon atoms, preferably 2 to 4 carbon atoms; an arylalkyl group of 7 to 40 carbon atoms, preferably 7 to 10 carbon atoms; an arylalkenyl group of 8 to 40 carbon atoms, preferably 8 to 12 carbon atoms; or an alkylaryl group of 7 to 40 carbon atoms, preferably 7 to 12 carbon atoms, or $R^{29}$ and $R^{30}$ may form a ring together with atoms bonded to them. $M^2$ is silicon, germanium or tin.

The alkyl group is a straight chain or branched alkyl group, and the halogen (halogenation) is fluorine, chlorine, bromine or iodine, preferably fluorine or chlorine.

Of the compounds of the formula (IV), advantageous are compounds in which M is zirconium or hafnium; $X^3$ and $X^4$ may be the same as or different from each other, and are each an alkyl group of 1 to 3 carbon atoms or a halogen atom; $R^{21}$'s are the same as each other, and are each an alkyl group of 1 to 4 carbon atoms; $R^{22}$ to $R^{28}$ may be the same as or different from each other, and are each hydrogen or an alkyl group of 1 to 4 carbon atoms; and Z is

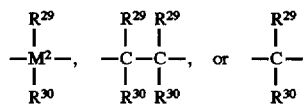

($M^2$ is silicon, and $R^{29}$ and $R^{30}$ may be the same as or different from each other, and are each an alkyl group of 1 to 4 carbon atom or an aryl group of 6 to 10 carbon atoms).

Among the compounds, preferred are compounds in which the substituents $R^{22}$ and $R^{28}$ are each hydrogen, and $R^{23}$ to $R^{27}$ are each an alkyl group of 1 to 4 carbon atoms or hydrogen.

More advantageous are compounds in which M is zirconium; $X^3$ and $X^4$ are each chlorine; $R^{21}$'s are the same as each other, and are each an alkyl group of 1 to 4 carbon atoms; $R^{22}$ and $R^{28}$ are each hydrogen; $R^{23}$ to $R^{27}$ may be the same as or different from each other, and are each an alkyl group of 1 to 4 carbon atoms or hydrogen; and Z is

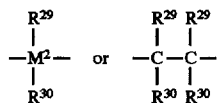

(wherein $M^2$ is silicon, and $R^{29}$ and $R^{30}$ may be the same as or different from each other, and are each an alkyl group of 1 to 4 carbon atom or an aryl group of 6 to 10 carbon atoms).

Of the compounds of the formula (IV), particularly advantageous are compounds in which M is zirconium; $X^3$ and $X^4$ are chlorine; the residual groups $R^{21}$ are each methyl; $R^{22}$ to $R^{28}$ are each hydrogen; and Z is

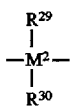

(wherein $M^2$ is silicon, and $R^{29}$ and $R^{30}$ may be the same as or different from each other, and are each methyl or phenyl).

Some preferred examples of the compounds represented by the formula (IV) are described below.

rac-Dimethylsilylene-bis{1-(2-methyl-4,5-benzoindenyl)}zirconium dichloride, rac-Dimethylsilylene-bis{1-(2-methyl-4,5-acenaphthocyclopentadienyl)}zirconium dichloride, rac-Dimethylsilylene-bis{1-(2,3,6-trimethyl-4,5-benzoindenyl)}zirconium dichloride, rac-Methylphenylsilylene-bis{1-(2-methyl-4,5-benzoindenyl)}zirconium dichloride, rac-Methylphenylsilylene-bis{1-(2-methyl-4,5-acenaphthocyclopentadienyl)}zirconium dichloride, rac-Methylphenylsilylene-bis{1-(4,5-benzoindenyl)}zirconium dichloride, rac-Methylphenylsilylene-bis{1-(2,6-dimethyl-4,5-benzoindenyl)}zirconium dichloride, and rac-Methylphenylsilylene-bis{1-(2,3,6-trimethyl-4,5-benzoindenyl)}zirconium dichloride.

Also employable are compounds obtained by replacing zirconium with titanium or hafnium in the above-exemplified compounds.

In the invention, a racemic modification of the above-mentioned metallocene compound (III) or (IV) is generally used as the olefin polymerization catalyst component, but R type or S type is also employable.

The metallocene compounds may be used in combination or two or more kinds.

The metallocene compounds may be used by contacting with a particulate carrier compound.

As the carrier compounds, there can be used inorganic carrier compounds such as $SiO_2$, $Al_2O_3$, $B_2O_3$, MgO, $ZrO_2$, CaO, $TiO_2$, ZnO, $Zn_2O$, $SnO_2$, BaO and ThO; and resins such as polyethylene, polypropylene, poly-1-butene, poly-4-methyl-1-pentene and styrene-divinylbenzene copolymer. These carrier compounds may be used in combination of two or more kinds.

The metallocene compounds may be used by diluting with hydrocarbons or halogenated hydrocarbons.

Next, the organoaluminum oxy-compound (B) and the compound (C) which reacts with the metallocene compound (A) to form an ion pair used for forming the metallocene catalyst (comprising the metallocene compound (A) of a transition metal selected from elements of Group IV of the periodic table, and the organoaluminum oxy-compound (B) and/or the compound (C)) are described.

(B) Organoaluminum oxy-compound

The organoaluminum oxy-compound used in the invention may be either conventionally known aluminoxane or a benzene-insoluble organoaluminum oxy-compound.

The conventionally known aluminoxane is represented by the following formula.

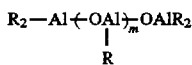

or

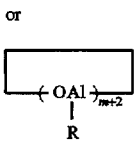

wherein R is a hydrocarbon group such as methyl, ethyl, propyl and butyl, preferably methyl or ethyl, particularly preferably methyl, and m is an integer of not less than 2, preferably an integer of 5 to 40.

This aluminoxane may be formed from mixed alkyloxyaluminum units of alkyloxyaluminum units represented by the formula $(OAl(R^1))$ and alkyloxyaluminum units represented by the formula $(OAl(R^2))$ (in these formulas, $R^1$ and $R^2$ are each the same hydrocarbon group as described for R, and $R^1$ and $R^2$ are different from each other).

The conventionally known aluminoxane can be prepared by, for example, the following procedures, and the aluminoxane is generally recovered in the form of an aromatic hydrocarbon solvent solution.

(1) An organoaluminum compound such as trialkylaluminum is added to an aromatic hydrocarbon solvent suspension of compounds containing adsorbed water or salts containing water of crystallization, e.g., magnesium chloride hydrate, copper sulfate hydrate, aluminum sulfate hydrate, nickel sulfate hydrate and cerous chloride hydrate, so as to allow the organoaluminum compound to react with the adsorbed water or the water of crystallization, and the reaction product is recovered as an aromatic hydrocarbon solvent solution.

(2) Water, ice or water vapor is allowed to directly act on an organoaluminum compound such as trialkylaluminum in a medium such as benzene, toluene, ethyl ether or tetrahydrofuran, and the reaction product is recovered as an aromatic hydrocarbon solvent solution.

Of the above procedures, the procedure (1) is preferably used.

Examples of the organoaluminum compounds used for preparing the solution of aluminoxane include the organoaluminum compounds described later.

The benzene-insoluble organoaluminum oxy-compound used in the invention can be obtained by, for example, contacting the solution of aluminoxane with water or an active hydrogen-containing compound or contacting the organoaluminum compound with water.

In the benzene-insoluble organoaluminum oxy-compound used for the invention, a ratio of the absorbance at about 1,260 $cm^{-1}$ ($D_{1260}$) to the absorbance at about 1,220 $cm^{-1}$ ($D_{1220}$) obtained by the infrared spectroscopic analysis of the compound, ($D_{1260}/D_{1220}$), is not more than 0.09, preferably not more than 0.08, particularly preferably in the range of 0.04 to 0.07.

The benzene-insoluble organoaluminum oxy-compound is presumed to have alkyloxyaluminum units represented by the following formula:

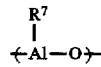

wherein $R^7$ is a hydrocarbon group of 1 to 12 carbon atoms. Examples of such hydrocarbon groups include methyl, ethyl, n-propyl, isopropyl, n-butyl, isobutyl, pentyl, hexyl, octyl, decyl, cyclohexyl and cyclooctyl. Of these, preferred are methyl and ethyl, and particularly preferred is methyl.

This benzene-insoluble organoaluminum oxy-compound may have, in addition to the alkyloxyaluminum units represented by the above formula, oxyaluminum units represented by the following formula:

wherein $R^8$ is a hydrocarbon group of 1 to 12 carbon atoms, an alkoxy group of 1 to 12 carbon atoms, an aryloxy group of 6 to 20 carbon atoms, a hydroxyl group, halogen or hydrogen.

$R^8$ is different from $R^7$ in the aforesaid formula.

When the organoaluminum oxy-compound contains the oxyaluminum units, it is desired that the alkyloxyaluminum units are contained in an amount of not less than 30% by mol, preferably not less than 50% by mol, particularly preferably not less than 70% by mol.

The organoaluminum oxy-compound used in the invention may contain a small amount of an organic compound component of other metal than aluminum.

(C) Compound which reacts with the metallocene compound (A) to form an ion pair

The compound (C) which reacts with the metallocene compound (A) to form an ion pair includes such Lewis acid, ionic compounds, borane compounds and carborane compounds as described in National Publications of international Patent No. 501950/1989 and No. 502036/1989, Japanese Patent Laid-Open Publication No. 179005/1991, No. 179006/1991, No. 207703/1991 and No. 207704/1991, and U.S. Pat. No. 547,718.

The Lewis acids include Mg-containing Lewis acid, Al-containing Lewis acid and B-containing Lewis acid. Of these, B-containing Lewis acid is preferred.

The Lewis acid which contains a boron atom is, for example, a compound represented by the following formula:

$$BR^1R^2R^3$$

wherein $R^1$, $R^2$ and $R^3$ are each independently a phenyl group which may have substituents such as fluorine, methyl and trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferred is tris(pentafluorophenyl)boron.

The ionic compound employable in the invention is a salt comprising a cationic compound and an anionic compound. The anion reacts with the metallocene compound (A) to render the compound (A) cationic and to form an ion pair so as to stabilize the transition metal cation species. Examples of such anion include organoboron compound anion, organoarsenic compound anion and organoaluminum compound anion. Preferred is such anion as is relatively bulky and stabilizes the transition metal cation species. Examples of cation include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation, etc.

Of these, preferred are the ionic compounds containing an organoboron compound anion, and particular examples thereof include: the trialkyl-substituted ammonium salts, such as triethylammoniumtetra(phenyl)boron,
tripropylammoniumtetra(phenyl)boron,
tri(n-butyl)ammoniumtetra(phenyl)boron,
trimethylammoniumtetra(p-tolyl)boron,
trimethylammoniumtetra(o-tolyl)boron,
tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-trifluoromethylphenyl)boron,
tri(n-butyl)ammoniumtetra(o-tolyl)boron and
tri(n-butyl)ammoniumtetra(4-fluorophenyl)boron;

N,N,-dialkylanilinium salts, such as

N,N-dimethylaniliniumtetra(phenyl)boron,
N,N-diethylaniliniumtetra(phenyl)boron, and
N,N-2,4,6-pentamethylaniliniumtetra(phenyl)boron; and dialkylammonium salts, such as di(1-propyl)ammoniumtetra(pentafluorophenyl)boron, and dicyclohexylammoniumtetra(phenyl)boron, triarylphosphonium salts, such as triphenylphosphoniumtetra(phenyl)boron,
tri(methylphenyl)phosphoniumtetra(phenyl)boron, and
tri(dimethylphenyl)phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate can be also employed in the invention.

Further, the following compounds are also employable. (In the ionic compounds enumerated below, the counter ion is tri(n-butyl)ammonium, but the counter ion is in no way limited thereto.)

That is, there can be mentioned salts of anion, for example, bis(tri(n-butyl)ammonium)nonaborate, bis(tri(n-butyl)ammonium)decaborate, bis(tri(n-butyl)ammonium)undecaborate, bis(tri(n-butyl)ammonium)dodecaborate, bis(tri(n-butyl)ammonium)decachlorodecaborate, bis(tri(n-butyl)ammonium)dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

Moreover, borane compounds and carborane compounds are also employable. These compounds are employed as the Lewis acids or the ionic compounds.

Examples of borane compounds, carborane complex compounds and salts of carborane anion include decaborane(14), 7,8-dicarbaundecaborane(13), 2,7-dicarbaundecaborane (13), undecahydride-7,8-dimethyl-7,8-dicarbaundecaborane, dodecahydride-11-methyl-2,7-dicarbaundecaborane, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8- dicarbaundecaborate and tri(n-butyl) ammoniumundecahydride-4,6-dibromo-7-carbaundecaborate.

Examples of the carborane compounds and salts of carborane include 4-carbanonaborane (14), 1,3-dicarbanonaborane(13), 6,9-dicarbadecaborane(14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds are also employable. (In the ionic compounds enumerated below, the counter ion is tri(n-butyl)ammonium, but the counter ion is in no way limited thereto.)

That is, there can be mentioned salts of metallic carborane and metallic borane anion, for example, tri(n-butyl) ammoniumbis(nonahydride-1,3-dicarbanonaborate) cobaltate (III), tri(n-butyl)ammoniumbis(undecahydride-7,8-dicarbaundecaborate)ferrate (III), tri(n-butyl) ammoniumbis(undecahydride-7,8-dicarbaundecaborate) cobaltate (III), tri(n-butyl)ammoniumbis(undecahydride-7,8-dicarbaundecaborate nickelate (III), tri(n-butyl) ammoniumbis(undecahydride-7,8-dicarbaundecaborate cuprate (III), tri(n-butyl)ammoniumbis(undecahydride-7,8-dicarbaundecaborate aurate (III), tri(n-butyl)ammoniumbis (nonahydride-7,8-dimethyl-7,8-dicarbaundecaborate ferrate (III), tri(n-butyl)ammoniumbis(nonahydride-7,8-dimethyl-7,8-dicarbaundecaborate chromate (III), tri(n-butyl) ammoniumbis(tribromooctahydride-7,8-dicarbaundecaborate cobaltate (III), tri(n-butyl) ammoniumbis(dodecahydridedicarbadodecaborate)-cobaltate (III), bis[tri(n-butyl)ammonium]bis (dodecahydridedodecaborate)-nickelate (III), tris[tri(n-butyl)ammonium]bis(undecahydride-7-carbaundecaborate) chromate (III), bis[tri(n-butyl)ammonium]bis (undecahydride-7-carbaundecaborate)manganate (IV), bis [tri(n-butyl)ammonium]bis(undecahydride-7-carbaundecaborate)cobaltate (III) and bis[tri(n-butyl) ammonium]bis(undecahydride-7-carbaundecaborate) nickelate (IV).

The above-mentioned compounds (C) which react with the metallocene compound (A) to form an ion pair can be used singly or in combination of two or more kinds.

(D) Organoaluminum compound

The organoaluminum compound (D) used in the invention can be represented by, for example, the following formula (a):

$$R^5_n AlX_{3-n} \quad (a)$$

wherein $R^5$ is a hydrocarbon group of 1 to 12 carbon atoms, X is a halogen atom or hydrogen, and n is 1 to 3.

In the above formula (a), $R^5$ is a hydrocarbon group of 1 to 12 carbon atoms, e.g., an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of such organoaluminum compounds include:
trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (D) is a compound represented by the following formula (b):

$$R^5_n AlY_{3-n} \quad (b)$$

wherein $R^5$ is the same as above; Y is $-OR^6$ group, $-OSiR^7_3$ group, $-OAlR^8_2$ group, $-NR^9_2$ group, $-SiR^{10}_3$ group or $-N(R^{11})AlR^{12}_2$ group; n is 1 to 2; $R^6$, $R^7$, $R^8$ and $R^{12}$ are each methyl, ethyl, isopropyl, isobutyl, cyclohexyl, phenyl or the like; $R^9$ is hydrogen, methyl, ethyl, isopropyl, phenyl, trimethylsilyl or the like; and $R^{10}$ and $R^{11}$ are each methyl, ethyl or the like.

Examples of such organoaluminum compounds include:

(i) compounds of the formula $R^5_n Al(OR^6)_{3-n}$, e.g., dimethylaluminum methoxide, diethylaluminum ethoxide and diisobutylaluminum methoxide;

(ii) compounds of the formula $R^5_n Al(OSiR^7_3)_{3-n}$, e.g., $(C_2H_5)_2Al(OSi(CH_3)_3)$, $(iso-C_4H_9)_2Al(OSi(CH_3)_3)$ and $(iso-C_4H_9)_2Al(OSi(C_2H_5)_3)$;

(iii) compounds of the formula $R^5_n Al(OAlR^8_2)_{3-n}$, e.g., $(C_2H_5)_2Al(OAl(C_2H_5)_2)$ and $(iso-C_4H_9)_2Al(OAl(iso-C_4H_9)_2)$;

(iv) compounds of the formula $R^5_n Al(NR^9_2)_{3-n}$, e.g., $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$ and $(iso-C_4H_9)_2Al[N(Si(CH_3)_3)_2]$; and (v) compounds of the formula $R^5_n Al(SiR^{10}_3)_{3-n}$, e.g., $(iso-C_4H_9)_2Al(Si(CH_3)_3)$.

Of these, preferred are organoaluminum compounds of the formulas $R^5_3Al$, $R^5_n Al(OR^6)_{3-n}$ and $R^5_n Al(OAlR^8_2)_{3-n}$, and particularly preferred are compounds of said formulas wherein $R^5$ is an isoalkyl group and n is 2. The organoaluminum compounds mentioned above may be used in combination of two or more kinds.

The specific metallocene catalyst used in the invention contains the metallocene compound (A), and the catalyst can be prepared from the metallocene compound (A) and the organoaluminum oxy-compound (B). Further, the metallocene catalyst can be formed from the metallocene compound (A) and the compound (C) which reacts with the compound (A) to form an ion pair, or the catalyst can be formed from the metallocene compound (A), the organoaluminum oxy-compound (B) and the compound (C) which forms an ion pair. In these embodiments, it is particularly preferred to use an organoaluminum compound (D) in combination.

In the present invention, the metallocene compound (A) is used in an amount of usually about 0.00005 to 0.1 mmol, preferably about 0.0001 to 0.05 mmol, in terms of the transition metal atom, per 1 liter of the polymerization volume.

The organoaluminum oxy-compound (B) is used in such an amount that the amount of the aluminum atom becomes usually about 1 to 10,000 mol, preferably 10 to 5,000 mol, per 1 mol of the transition metal atom.

The compound (C) which reacts with the metallocene compound (A) to form an ion pair is used in such an amount that the amount of the boron atom becomes usually about 0.5 to 20 mol, preferably 1 to 10 mol, per 1 mol of the transition metal atom.

The organoaluminum compound (D) is used, if desired, in an amount of usually about 0 to 1,000 mol, preferably about 0 to 500 mol, per 1 mol of the aluminum atom in the organoaluminum oxy-compound (B) or the boron atom in the compound (C) which forms an ion pair.

When the ethylene (a), the α-olefin of 3 or more carbon atoms (b) and two different nonconjugated polyene (c) and (d) are copolymerized using the above-mentioned metallocene catalyst, an ethylene-α-olefin-nonconjugated polyene-nonconjugated polyene tetrapolymer rubber (ethylene copolymer rubber) can be obtained with high polymerization activity.

Even if the ethylene (a), the α-olefin of 3 to 20 carbon atoms (b) and the nonconjugated polyenes (c) and (d) are copolymerized using a Group VB transition metal compound catalyst such as a vanadium catalyst, it is impossible to obtain a copolymer rubber with high polymerization activity.

On the other hand, when the Group IVB metallocene catalyst is used as in the present invention, the two types of nonconjugated polyene are not limited to the norbornene ring-containing polyenes, and the aforesaid various types of polyenes including chain nonconjugated polyenes such as 7-methyl-1,6-octadiene (MOD) can be also copolymerized.

In the copolymerization of ethylene (a), the α-olefin of 3 to 20 carbon atoms (b) and the nonconjugated polyenes (c) and (d), the metallocene compound (A), organoaluminum oxy-compound (B) and the compound (C) which reacts with compound (A) to form an ion pair, and if desired, the organoaluminum compound (D), all of which constitute the metallocene catalyst, may be separately fed to the polymerization reactor, or the metallocene catalyst containing the metallocene compound (A), which is preliminarily prepared, may be added to the polymerization reaction system.

In the preparation of the metallocene catalyst, hydrocarbon media which are inert to the catalyst components can be employed. Examples of the inert hydrocarbon media include aliphatic hydrocarbons, such as propane, butane, pentane, hexane, heptane, octane, decane, and dodecane; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbons may be used alone or in combination.

The metallocene compound (A), the organoaluminum oxy-compound (B), the compound (C) which forms an ion pair and the organoaluminum compound (D) can be contacted with each other at a temperature of usually −100° to 200° C., preferably −70° to 100° C.

In the invention, copolymerization of ethylene (a), the α-olefin of 3 to 20 carbon atoms (b), two different nonconjugated polyenes (c) and (d) can be carried out under the conditions of a temperature of usually 40° to 200° C., preferably 50° to 150° C., more preferably 60° to 120° C., particularly preferably 70° to 120° C., and a pressure of atmospheric pressure to 100 kg/cm$^2$, preferably atmospheric pressure to 50 kg/cm$^2$, particularly preferably atmospheric pressure to 30 kg/cm$^2$.

Although the copolymerization reaction can be performed by various processes, the reaction is preferably performed by a solution polymerization process. In the solution polymerization process, the aforesaid hydrocarbons or α-olefin such as propylene may be employable as the polymerization solvents.

The copolymerization can be carried out either batchwise, semi-continuously or continuously, but it is preferably carried out continuously. The polymerization can be conducted in two or more stages having different reaction conditions.

The reaction time (the average residence time when the copolymerization is carried out continuously) differs from the polymerization conditions such as catalyst concentration and polymerization temperature, but it is usually about 5 minutes to 5 hours, preferably about 10 minutes to 3 hours.

The above-described specific ethylene copolymer rubber is obtained by the present invention, and the molecular weight of this random copolymer can be regulated by varying the polymerization conditions such as polymerization temperature or controlling the amount of hydrogen (molecular weight regulator).

In the present invention, the organoaluminum oxy-compound or the ionic compound may be used by supporting it on the aforementioned carrier compound.

When the ethylene (a), the α-olefin (b) and the nonconjugated polyenes (c) and (d) are copolymerized as described above, the ethylene copolymer rubber is obtained in the form of usually a polymer solution containing it. This polymer solution is treated in a conventional manner to obtain an ethylene copolymer rubber.

Graft modified product of ethylene copolymer rubber

The ethylene copolymer rubber according to the invention can be used by modifying it through graft polymerization of the ethylene copolymer rubber with a polar monomer.

The ethylene copolymer rubber having been graft modified (sometimes referred to as "graft modified ethylene copolymer rubber") can be obtained by allowing the ethylene copolymer rubber to react with a polar monomer described below in the presence or the absence of a radical initiator.

The polar monomer is, for example, a hydroxyl group-containing ethylenically unsaturated compound, an amino group-containing ethylenically unsaturated compound, an epoxy group-containing ethylenically unsaturated compound, an aromatic vinyl compound, an unsaturated carboxylic acid or its derivative, an vinyl ester compound or vinyl chloride.

Particular examples of the hydroxyl group-containing ethylenically unsaturated compounds include (meth) acrylates, such as hydroxyethyl(meth)acrylate, 2-hydroxypropyl(meth)acrylate, 3-hydroxypropyl (meth) acrylate, 2-hydroxy-3-phenoxypropyl(meth)acrylate, 3-chloro-2-hydroxypropyl(meth)acrylate, glycerol mono (meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydroxyhexanoyloxy)ethyl acrylate; 10-undecene-1-ol, 1-octene-3-ol, 2-methanolnorbornene, hydroxystyrene, hydroxyethyl vinyl ether, hydroxybutyl vinyl ether, N-methylolacrylamide, 2-(meth)acroyloxyethyl acid phosphate, glycerol monoallyl ether, allyl alcohol, allyloxyethanol, 2-butene-1,4-diol and glycerol monoalcohol.

The amino group-containing ethylenically unsaturated compound is a compound having an ethylenic double bond and an amino group, and such compound is, for example, a vinyl monomer having at least one amino group or substituted amino group represented by the following formula:

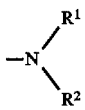

wherein R¹ is hydrogen, methyl or ethyl, and R² is hydrogen, an alkyl group having 1 to 12 carbon atoms (preferably 1 to 8 carbon atoms) or a cycloalkyl group having 6 to 12 carbon atoms (preferably 6 to 8 carbon atoms). The alkyl group and the cycloalkyl group may have a substituent.

Examples of the amino group-containing ethylenically unsaturated compounds include alkyl ester derivatives of acrylic acids or methacrylic acids, such as aminoethyl (meth)acrylate, propylaminoethyl (meth)acrylate, dimethylaminoethyl (meth)acrylate, aminopropyl (meth)acrylate, phenylaminoethyl methacrylate and cyclohexylaminoethyl methacrylate; vinyl amine derivatives, such as N-vinyldiethylamine and N-acetylvinylamine; allylamine derivatives, such as allylamine, methacrylamine, N-methylacrylamine, N,N-dimethylacrylamine and N,N-dimethylaminopropylacrylamine; acrylamide derivatives, such as acrylamide and N-methylacrylamide; aminostyrenes, such as p-aminostyrene; 6-aminohexylsuccinimide; and 2-aminoethylsuccinimide.

The epoxy group-containing ethylenically unsaturated compound is a monomer having at least one polymerizable unsaturated bond and at least one epoxy group in one molecule. Examples of such epoxy group-containing ethylenically unsaturated compounds include glycidyl acrylate and glycidyl methacrylate; dicarboxylic acid mono and dialkylglycidyl esters (number of carbon atoms of the alkyl group in the case of monoglycidyl ester: 1–12), such as mono and diglycidyl esters of maleic acid, mono and diglycidyl esters of fumaric acid, mono and diglycidyl esters of crotonic acid, mono and diglycidyl esters of tetrahydrophthalic acid, mono and diglycidyl esters of itaconic acid, mono and diglycidyl esters of butenetricarboxylic acid, mono and diglycidyl esters of citraconic acid, mono and diglycidyl esters of endo-cis-bicyclo[2,2,1]hepto-5-ene-2,3-dicarboxylic acid (nadic acid™), mono and diglycidyl esters of endo-cis-bicyclo[2,2,1]hepto-5-ene-2-methyl-2,3-dicarboxylic acid (methylnadic acid™), and mono and diglycidyl esters of allylsuccinic acid; alkylglycidyl esters of p-styrenecarboxylic acid, allylglycidyl ether, 2-methylallylglycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, and vinylcyclohexene monooxide.

The aromatic vinyl compound is, for example, a compound represented by the following formula:

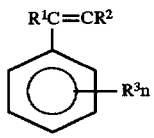

wherein R¹ and R² are each independently hydrogen or an alkyl group of 1 to 3 carbon atoms, such as methyl, ethyl, propyl or isopropyl, R³ is a hydrocarbon group of 1 to 3 carbon atoms or a halogen atom, such as methyl, ethyl, propyl, isopropyl, chlorine, bromine or iodine, and n is usually an integer of 0 to 5, preferably an integer of 1 to 5.

Examples of such aromatic vinyl compounds include styrene, α-methylstyrene, o-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

Examples of the unsaturated carboxylic acids include unsaturated carboxylic acids, such as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hepto-2-ene-5,6-dicarboxylic acid; acid anhydrides of these acids; and derivatives of these acids (e.g., acid halides, amides, imides and esters). Particular examples of such compounds include malenyl chloride, malenylimide, maleic anhydride, itaconic anhydride, citraconic anhydride, tetrahydrophthalic anhydride, bicyclo[2,2,1]hepto-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hepto-2-ene-5,6-dicarboxylate, hydroxyethyl (meth)acrylate, hydroxypropyl (meth)acrylate, glycidyl (meth)acrylate, aminoethyl methacrylate and aminopropyl methacrylate. Of these, preferred are (meth)acrylic acid, maleic anhydride, hydroxyethyl (meth)acrylate, glycidyl methacrylate and aminopropyl methacrylate.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butylbenzoate, vinyl salicylate and vinyl cyclohexanecaboxylate.

The polar monomer is used in an amount of usually 0.1 to 100 parts by weight, preferably 0.5 to 80 parts by weight, based on 100 parts by weight of the ethylene copolymer rubber.

The radical initiator is, for example, an organic peroxide or an azo compound.

Examples of the organic peroxides include dicumyl peroxide, di-t-butyl peroxide, 2,5-dimethyl-2,5-bis(t-butylperoxy)hexane, 2,5-dimethyl-2,5-bis(t-butylperoxy)hexyne-3, 1,3-bis(t-butylperoxyisopropyl)benzene, 1,1-bis(t-butylperoxy)valerate, benzoyl peroxide, t-butyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide. Examples of the azo compounds include azoisobutyronitrile and dimethylazoisobutyronitrile.

The radical initiator is used in an amount of usually 0.001 to 10 parts by weight based on 100 parts by weight of the ethylene copolymer rubber.

The radical initiator can be used by mixing it with the ethylene copolymer rubber and the polar monomer, but it may be used after dissolving it in a small amount of an organic solvent. As the organic solvent, any organic solvents can be employed without specific limitation as far as they dissolve the radical initiator. Examples of the organic solvents include aromatic hydrocarbon solvents, such as benzene, toluene and xylene; aliphatic hydrocarbon solvents, such as pentane, hexane, heptane, octane, nonane and decane; alicyclic hydrocarbon solvents, such as cyclohexane, methylcyclohexane and decahydronaphthalene; chlorinated hydrocarbons, such as chlorobenzene, dichlorobenzene, trichlorobenzene, methylene chloride, chloroform, carbon tetrachloride and tetrahcloroethylene; alcohol solvents, such as methanol, ethanol, n-propanol, iso-propanol, n-butanol, sec-butanol and tert-butanol; ketone solvents, such as acetone, methyl ethyl ketone and methyl isobutyl ketone; ester solvents, such as ethyl acetate and dimethyl phthalate; and ether solvents, such as dimethyl ether, diethyl ether, di-n-amyl ether, tetrahydrofuran and dioxyanisole.

In the present invention, a reducing material may be used in the graft modification of the ethylene copolymer rubber. The reducing material serves to enhance the graft amount in the graft modified ethylene copolymer rubber.

The reducing material includes not only iron(II) ion, chromium ion, cobalt ion, nickel ion, palladium ion, sulfite, hydroxylamine and hydrazine but also compounds containing groups such as —SH, $SO_3H$, —$NHNH_2$ and —COCH(OH)—.

Examples of such reducing materials include ferrous chloride, potassium bichromate, cobalt chloride, cobalt naphthenate, palladium chloride, ethanolamine, diethanolamine, N,N-dimethylaniline, hydrazine, ethylmercaptan, benzenesulfonic acid and p-toluenesulfonic acid.

The reducing material is used in an amount of usually 0.001 to 5 parts by weight, preferably 0.1 to 3 parts by weight, based on 100 parts by weight of the ethylene copolymer rubber.

The graft modification of the ethylene copolymer rubber can be carried out by a conventional manner. For example, the ethylene copolymer rubber is dissolved in an organic solvent, and to the solution is then added the polar monomer and the radical initiator to react them at 70° to 200° C., preferably 80° to 190° C., for 0.5 to 15 hours, preferably 1 to 10 hours.

There is no specific limitation on the organic solvent used for graft modifying the ethylene copolymer rubber, and any organic solvents can be used as far as they dissolve the ethylene copolymer rubber.

Examples of such organic solvents include aromatic hydrocarbon solvents such as benzene, toluene and xylene; and aliphatic hydrocarbon solvents such as pentane, hexane and heptane.

The graft-modified ethylene copolymer rubber can be prepared by reacting the ethylene copolymer rubber with the polar monomer in the absence of any solvent using an extruder or the like. In this case, the reaction temperature is usually not lower than the melting point of the ethylene copolymer rubber, specifically, in the range of 120° to 250° C. The reaction time under such temperature condition is usually in the range of 0.5 to 10 minutes.

In the graft modified ethylene copolymer rubber thus prepared, the graft amount of the graft group derived from the polar monomer is in the range of usually 0.1 to 50% by weight, preferably 0.2 to 30% by weight.

The modified ethylene copolymer rubber obtained as above is excellent in adhesion strength to metals and polar resins. Further, when the modified ethylene copolymer rubber is blended with a polar resin, the polar resin can be improved in impact resistance, particularly, low-temperature impact resistance.

Furthermore, molded articles obtained from the modified ethylene copolymer rubber (modified ethylene random copolymer) are excellent in printability and paintability onto the surfaces thereof. Moreover, if polyolefins are blended with the modified ethylene copolymer rubber (modified ethylene random copolymer) together with fillers such as glass fibers or inorganic compounds, resin compositions improved in dispersibility of fillers can be obtained, whereby advantages given by using the fillers can be maintained and the resulting resin compositions are improved in mechanical strength.

Vulcanizable rubber composition

The rubber composition containing the ethylene copolymer rubber according to the invention is a vulcanizable rubber composition. (The rubber composition of the invention is sometimes referred to as "vulcanizable rubber composition" hereinafter.) This rubber composition can be used in the unvulcanized state, but if it is used as the vulcanized product, much more improved properties can be exhibited.

The vulcanizable rubber composition according to the invention can be vulcanized by heating it with a vulcanizing agent or irradiating it with electron rays without using a vulcanizing agent.

The vulcanizable rubber composition of the invention may appropriately contain other components according to the purpose in addition to the ethylene copolymer, and the ethylene copolymer rubber is contained in an amount of not less than 20% by weight, preferably not less than 25% by weight, based on the whole amount of the rubber composition. When the amount of the ethylene copolymer rubber in the rubber composition is in the above range of amount, the composition exhibits favorable properties.

Examples of the other components which may be incorporated into the composition include various chemicals such as reinforcing agents, inorganic fillers, softening agents, antioxidants (stabilizers), processing aids, compounds which constitute a foaming system (e.g., foaming agent and foaming aid), plasticizers, colorants, flaim retardants and other rubbers. The kinds and the amounts of the additives are properly determined depending on the purpose. Of the above additives, preferably used are reinforcing agent, inorganic filler, softening agent, etc. Details of these additives are described below.

Reinforcing agent and inorganic filler

Examples of the reinforcing agents include carbon blacks such as SRF, GPF, FEF, MAF, HAF, ISAF, SAF, FT and MT, surface treated materials obtained by surface treating of the above carbon blacks with silane coupling agents, silica, active calcium carbonate, powdery talc and powdery silicic acid.

Examples of the inorganic fillers include precipitated calcium carbonate, ground limestone, talc and clay.

The rubber composition of the invention may contain the reinforcing agent and/or the inorganic filler in an amount of usually not more than 300 parts by weight, preferably 10 to 300 parts by weight, more preferably 10 to 200 parts by weight, based on 100 parts by weight of the ethylene copolymer rubber.

From the rubber composition containing the reinforcing agent in the above-mentioned amount, a vulcanized rubber improved in mechanical properties such as tensile strength, tear strength and abrasion resistance can be obtained.

If the inorganic filler is added in the above-mentioned amount, the hardness can be improved without deteriorating other properties of the vulcanized rubber, and the cost can be lowered.

Softening agent

As the softening agents, those conventionally added to rubbers can be widely used, and examples thereof include:

petroleum type softening agents, such as process oil, lubricant, paraffin, liquid paraffin, petroleum asphalt and vaseline;

coal tar type softening agents, such as coal tar and coal tar pitch;

fatty oil type softening agents, such as castor oil, linseed oil, rapeseed oil and coconut oil;

waxes, such as tall oil, factice, beeswax, carnauba wax and lanolin;

fatty acids and fatty acid salts, such as ricinoleic acid, palmitic acid, barium stearate, calcium stearate and zinc laurate; and synthetic polymer materials, such as petroleum resin, atactic polypropylene and coumarone-indene resin.

Of these, preferred are petroleum type softening agents, and particularly preferred is process oil.

The softening agent may be contained in the rubber composition of the invention in an amount of usually not more than 200 parts by weight, preferably 10 to 200 parts by weight, more preferably 10 to 150 parts by weight, particularly preferably 10 to 100 parts by weight, based on 100 parts by weight of the ethylene copolymer rubber.

Antioxidant

The antioxidant is preferably contained in the rubber composition of the invention because the material life can be lengthened.

Examples of the antioxidants include:

aromatic secondary amine type stabilizers, such as phenylnaphthylamine, 4,4'-($\alpha,\alpha$-dimethylbenzyl) diphenylamine, and N,N'-di-2-naphthyl-p-phenylenediamine;

phenol type stabilizers, such as 2,6-di-t-butyl-4-methylphenol, and tetrakis-(methylene-3-(3',5'-di-t-butyl-4'-hydroxyphenyl)propionate)methane;

thioether type stabilizers, such as bis(2-methyl-4-(3-n-alkylthiopropionyloxy)-5-t-butylphenyl)sulfide;

benzimidazole type stabilizers, such as 2-mercaptobenzimidazole;

dithiocarbamate type stabilizers, such as nickel dibutyldithiocarbamate; and quinoline type stabilizers, such as a polymer from 2,2,4-trimethyl-1,2-dihydroquinoline. These stabilizers may be used in combination of two or more kinds.

The antioxidant may be used in an amount of not more than 5 parts by weight, preferably not more than 3 parts by weight, based on 100 parts by weight of the ethylene copolymer rubber.

Processing aid

As the processing aids, those conventionally added to rubbers can be widely used. Examples thereof include various acids, such as ricinoleic acid, stearic acid, palmitic acid and lauric acid; salts of these higher fatty acids, such as barium stearate, zinc stearate and calcium stearate; and esters of the above acids.

The processing aid may be used in an amount of not more than 10 parts by weight, preferably not more than 5 parts by weight, based on 100 parts by weight of the ethylene copolymer rubber.

Vulcanizing agent

When the rubber composition of the invention is vulcanized by heating, compounds which constitute a vulcanization system such as vulcanizing agent, vulcanization accelerator and vulcanization aid are generally added to the rubber composition.

Examples of the vulcanizing agents employable herein include sulfur, sulfur compounds and organic peroxides.

There is no specific limitation on the type of sulfur, and, for example, powdery sulfur, precipitated sulfur, colloidal sulfur, surface-treated sulfur and insoluble sulfur can be employed.

Examples of the sulfur compounds include sulfur chloride, sulfur dichloride, high-molecular weight polysulfide, morpholine disulfide, alkylphenol disulfide, tetramethylthiuram disulfide and selenium dimethyldithiocarbamate.

Examples of the organic peroxides include:

alkyl peroxides, such as dicumyl peroxide, di-t-butyl peroxide, di-t-butylperoxy-3,3,5-trimethylcyclohexane, t-butylcumyl peroxide, di-t-amyl peroxide, 2,5-dimethyl-2,5-di(t-butylperoxy) hexyne-3, 2,5-dimethyl-2,5-di(benzoylperoxy)hexane, 2,5-dimethyl-2,5-di(t-butylperoxy)hexane, $\alpha,\alpha'$-bis(t-butylperoxy-m-isopropyl)benzene and t-butyl hydroperoxide;

peroxy esters such as t-butyl peroxyacetate, t-butyl peroxyisobutyrate, t-butyl peroxypivalate, t-butylperoxymaleic acid, t-butyl peroxyneodecanoate, t-butyl peroxybenzoate, and di-t-butyl peroxyphthalate; and ketone peroxides, such as dicyclohexanone peroxide.

These organic peroxides may be used alone or in combination of two or more kinds.

Of these, preferred are organic peroxides having a temperature, at which the half-life period thereof is one minute, of 130° to 200° C., for example, dicumyl peroxide, di-t-butyl peroxide, di-t-butylperoxy-3,3,5-trimethylcyclohexane, t-butylcumyl peroxide, di-t-amyl peroxide and t-butyl hydroperoxide.

Of the above-mentioned various vulcanizing agents, sulfur or the sulfur compound, especially sulfur, is preferred in the invention, because particularly improved properties of the rubber composition can be exhibited.

When the vulcanizing agent is sulfur or the sulfur compound, it is used in an amount of 0.1 to 10 parts by weight, preferably 0.5 to 5 parts by weight, based on 100 parts by weight of the unsaturated ethylene copolymer.

When the vulcanizing agent is the organic peroxide, it is used in an amount of 0.0003 to 0.05 mol, preferably 0.001 to 0.03 mol, based on 100 g of the ethylene copolymer rubber.

Vulcanization accelerator

When sulfur or the sulfur compound is used as the vulcanizing agent, a vulcanization accelerator is preferably used in combination.

Examples of the vulcanization accelerators include:

sulfenamide compounds, such as N-cyclohexyl-2-benzothiazole sulfenamide (CBS), N-oxydiethylene-2-benzothiazole sulfenamide and N,N-diisopropyl-2-benzothiazole sulfenamide;

thiazole compounds, such as 2-mercaptobenzothiazole (MBT), 2-(2,4-dinitrophenyl)mercaptobenzothiazole, 2-(2,6-diethyl-4-morpholinothio)benzothiazole and dibenzothiazyl disulfide;

guanidine compounds, such as diphenylguanidine, triphenylguanidine, diorthonitrileguanidine, orthonitrile biguanide and diphenylguanidine phthaliate;

aldehyde amines or aldehyde-ammonia compounds, such as acetaldehyde-aniline reaction product, butylaldehyde-aniline condensate, hexamethylenetetramine and acetaldehyde ammonia;

imidazoline compounds, such as 2-mercaptoimidazoline;

thiourea compounds, such as thiocarbanilide, diethylthiourea, dubutylthiourea, trimethylthiourea and diorthotolylthiourea;

thiuram compounds, such as tetramethylthiuram monosulfide, tetramethylthiuram disulfide (TMTD), tetraethylthiuram disulfide, tetrabutylthiuram disulfide, pentamethylenethiuram tetrasulfide and dipentamethylenethiuram tetrasulfide (DPTT);

dithio acid salt compounds, such as zinc dimethyldithiocarbamate, zinc diethyldithiocarbamate, zinc di-n-butyldithiocarbamate, zinc ethylphenyldithiocabamate, zinc butylphenyldithiocarbamate, sodium dimethyldithiocarbamate, selenium dimethyldithiocarbamate and tellurium dimethyldithiocarbamate;

xanthate compounds, such as zinc dibutylxanthate; and zinc white.

The vulcanization accelerator is desirably used in an amount of 0.1 to 20 parts by weight, preferably 0.2 to 10 parts by weight, based on 100 parts by weight of the ethylene copolymer rubber.

Vulcanization aid

When the organic peroxide is used as the vulcanizing agent, a vulcanization aid is preferably used in an amount of 0.5 to 2 mol based on 1 mol of the organic peroxide, preferably almost in the equimolar amount.

Examples of the vulcanization aids include:

sulfur;

quinonedioxime compounds, such as p-quinonedioxime; and especially polyfunctional monomers, such as:
(meth)acrylate compounds, such as trimethylolpropane triacrylate and polyethylene glycol dimethacrylate;
allyl compounds, such as diallyl phthalate and triallyl cyanurate;
maleimide compounds, such as m-phenylene bismaleimide; and
divinylbenzene.

Foaming agent

When the rubber composition of the invention contains a compound which constitutes a foaming system, such as a foaming agent or a foaming aid, the composition can be subjected to foam molding.

As the foaming agents, those conventionally used in the foam molding of rubbers can be widely used. Particular examples thereof include inorganic foaming agents, such as sodium bicarbonate, sodium carbonate, ammonium bicarbonate, ammonium carbonate and ammonium nitrite; nitroso compounds, such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonylhydrazide compounds, such as benzenesulfonylhydrazide, toluenesulfonylhydrazide, p,p'-oxybis(benzenesulfonylhydrazide) and diphenylsulfone-3, 3'-disulfonylhydrazide; azide compounds, such as calcium azide, 4,4-diphenyldisulfonylazide and p-toluenesulfonylazide.

Of these, preferred are nitroso compounds, azo compounds and azide compounds.

The foaming agent may be used in an amount of 0.5 to 30 parts by weight, preferably 1 to 20 parts by weight, based on 100 parts by weight of the ethylene copolymer rubber. From the rubber composition containing the foaming agent in such amount, foamed products having an apparent specific gravity of 0.03 to 0.8 g/cm$^3$ can be produced.

In combination with the foaming agent, a foaming aid can be employed. When the foaming aid is used in combination, various effects such as lowering of decomposition temperature of the foaming agent, acceleration of decomposition thereof and uniformity of the resulting foam can be exerted. Examples of the foaming agents include organic acids, such as salicylic acid, phthalic acid, stearic acid and oxalic acid, urea and its derivative.

The foaming aid may be used in an amount of 0.01 to 10 parts by weight, preferably 0.1 to 5 parts by weight, based on 100 parts by weight of the ethylene copolymer rubber.

Other rubber

The rubber composition of the invention may be used by blending other known rubbers within limits no prejudical to the objects of the invention.

Examples of such rubbers include natural rubbers (NR); isoprene type rubbers, such as isoprene rubber (IR); and conjugated diene type rubbers, such as butadiene rubber (BR), styrene-butadiene rubber (SBR), acrylonitrile-butadiene rubber (NBR) and chloroprene rubber (CR).

Also employable are conventionally known ethylene-α-olefin copolymer rubbers, for example, ethylene-propylene random copolymer (EPR) and an ethylene copolymer other than the above ethylene copolymer rubber, such as EPDM.

The vulcanizable rubber composition of the invention can be prepared from the ethylene copolymer rubber and the above-mentioned other components by conventional processes for preparing rubber blends. For example, the ethylene copolymer rubber and other components are kneaded at 80° to 170° C. for 3 to 10 minutes using an internal mixer such as Banbury mixer, kneader and intermixer, then the vulcanizing agent and the vulcanization accelerator or the vulcanization aid are added if necessary, and the resulting mixture is kneaded at a roll temperature of 40° to 80° C. for 5 to 30 minutes using a roll (e.g., an open roll) or a kneader, followed by delivering. Thus, a rubber composition (rubber blend) in the form of usually ribbon or sheet can be obtained. If the temperature for kneading by the use of the internal mixer is low, the vulcanizing agent, the vulcanization accelerator and the foaming agent may be simultaneously kneaded.

Vulcanized rubber

A vulcanizate (vulcanized rubber) of the rubber composition of the invention can be obtained by generally preforming the unvulcanized rubber composition into a desired shape using various means such as an extrusion molding machine, a calender roll, a press, an injection molding machine and a transfer molding machine, and simultaneously or thereafter heating the preform in a vulcanizing bath or irradiating it with electron rays so as to vulcanize it.

When the rubber composition is vulcanized by heating, the rubber composition is preferably heated at a temperature of 150° to 270° C. for 1 to 30 minutes using a heating bath of hot air, glass bead fluidized bed, UHF (ultrahigh frequency electromagnetic wave), steam or LCM (molten salt bath).

When the rubber composition is vulcanized by irradiation with electron rays without using a vulcanizing agent, the preformed rubber composition is irradiated with electron rays having energy of 0.1 to 10 MeV, preferably 0.3 to 2 MeV at an absorbed dose of 0.5 to 35 Mrad, preferably 0.5 to 10 Mrad.

In the preforming and vulcanization, a mold may be used or may not be used. If a mold is not used, preforming and vulcanization of the rubber composition are generally carried out continuously.

The rubber composition thus preformed and vulcanized (vulcanized rubber) can be used for automotive industrial parts such as weatherstrip, door glass run channel, window frame, radiator hose, brake parts and wiper blade; industrial rubber parts such as rubber roll, belt, packing and hose; electrical insulating materials such as anode cap and grommet; civil engineering and building materials such as building gasket and civil engineering sheet; and rubberized fabrics.

The vulcanized foamed product obtained by foaming the rubber blend containing the foaming agent under heating can be used for heat insulating materials, cushioning materials, sealing materials, etc.

EFFECT OF THE INVENTION

According to the present invention, an ethylene copolymer rubber having excellent extrusion moldability, high vulcanization rate, good mechanical properties such as high vulcanization strength, excellent low-temperature flexibility and heat aging resistance, and a rubber composition containing the ethylene copolymer rubber can be obtained.

Further, according to the process for preparing an ethylene copolymer rubber of the present invention, ethylene, an a-olefin of 3 or more carbon atoms, a nonconjugated polyene containing one polymerizable carbon-to-carbon double bond in one molecule and a nonconjugated polyene containing two polymerizable carbon-to-carbon double bonds in one molecule can be copolymerized with high activity, high conversion ratio of α-olefin and high random copolymerizability to provide a copolymer having a high molecular weight, though such copolymerization was unable to be attained by the conventional processes. Moreover, the process of the present invention has high polymerization activity at high temperatures, and hence an ethylene copolymer rubber can be efficiently prepared.

EXAMPLE

The present invention will be further described with reference to the following examples, but it should be construed that the invention is in no way limited to those examples.

Properties were measured by the following methods.

(i) Measurement of specific gravity

A specimen (20 mm×20 mm) was punched from the upper part of a vulcanized tubular sponge rubber, and the surface of the specimen was wiped with alcohol to remove stain. Then, the specimen was fixed to an automatic specific gravity hydrometer (Model M-1, manufactured by Toyo Seiki Seisakusho) in an atmosphere of 25° C., and the specific gravity was determined from the difference between the mass in air and the mass in pure water.

(ii) Tensile test

In Examples 1 to 3, Example 5 and Comparative Example 1, the tensile test was carried out in the following manner.

From the upper part of a vulcanized tubular sponge rubber, a specimen was punched in the longitudinal direction of the sponge rubber by means of a dumbbell of No. 3 described in JIS K 6301 (1989). The specimen was subjected to a tensile test in accordance with JIS K 6301, Section 3, under the conditions of a measuring temperature of 25° C. and a tensile rate of 500 mm/min to measure a tensile stress at break $T_B$ (kg/cm$^2$) and an elongation at break $E_B$ (%).

In Example 4, Examples 6 to 8 and Comparative Example 2, the tensile test was carried out in the following manner.

A tensile stress at break $T_B$ (kg/cm$^2$) and an elongation at break $E_B$ (%) were measured in the same manner as described above, except that a specimen was punched from a vulcanized rubber sheet by means of the above-mentioned dumbbell of No. 3.

(iii) Permanent compression set test

In Examples 1 to 3, Example 5 and Comparative Example 1, the permanent compression set test was carried out in the following manner.

A vulcanized tubular sponge rubber was cut to give a specimen of 30 mm, and the specimen was fixed to a permanent compression set measuring mold. Then, the specimen was compressed so that the height of the specimen became ½ of the height before application of a load. Then, the specimen with the mold was heat-treated in a Geer oven at 70° C. for 200 hours. After the specimen was allowed to stand for cooling for 30 minutes, the height of the specimen was measured, and the permanent compression set of the specimen was calculated by the following equation.

$$\text{Permanent compression set (\%)} = \frac{t_0 - t_1}{t_0 - t_2} \times 100$$

$t_0$: height of specimen before test $t_1$: height of specimen after heat treatment and 30-minute cooling $t_2$: height of specimen in the state where specimen is fixed to measuring mold In Example 4, Examples 6 to 8 and Comparative Example 2, the permanent compression set test was carried out in the following manner.

As the permanent compression set, a low-temperature permanent compression set (CS) after 22 hours at −40° C. was determined in accordance with JIS K 6301.

In any of the above cases, with decrease of the low-temperature permanent compression set, the low-temperature flexibility becomes better.

(iv) Measurement of shape retention

A vulcanized tubular sponge rubber was measured on its sectional height and sectional width, and a ratio of the height to the width was taken as a shape retention ratio.

$$\text{Shape retention ratio (\%)} = \frac{L}{D} \times 100$$

L: height of tubular sponge rubber

D: width of tubular sponge rubber (v) Measurement of surface roughness

The surface roughness of a sponge rubber was evaluated by numerically expressing protrusions and depressions on the upper surface of the sponge rubber using a feeler type surface roughness measuring device. In detail, the tubular sponge rubber was cut to give a specimen having a length of 50 mm. From the total ($h_1$) of the heights of ten protrusions of from the highest protrusion to the tenth protrusion therefrom, the total ($h_2$) of the heights of ten depressions of from the deepest depression to the tenth depression therefrom was subtracted. The obtained value ($h_1-h_2$) was divided by 10, and the value finally obtained was taken as the surface roughness of the sponge rubber.

(vi) Hardness test (Hs hardness)

The hardness test was carried out in accordance with JIS K 6301 to measure a spring hardness Hs (JIS A hardness).

(vii) Aging test

As the aging test, an air-oven aging test was carried out at 125° C. for 168 hours to measure retention ratios to the properties before aging, i.e., tensile strength retention ratio ($A_R(T_B)$) and elongation retention ratio ($A_R(E_B)$), and a change of hardness ($A_H$) (JIS A).

(viii) Evaluation of extrudability

A compounded rubber was extruded at an extrusion rate of 30 m/min by means of an extruder (cylinder temperature: 70° C., head temperature: 80° C., die temperature: 90° C.) equipped with a circular die having a diameter of 3 mm. Then, the surface condition of the compounded rubber thus extruded was evaluated based on the evaluation criterion B of surface smoothness specified in ASTM D 2230-77 and classified into five classes, where the class 5 represents the most excellent surface condition and the class 1 represents the worst surface condition that a melt fracture occurred during extrusion molding.

Further, a length of the compounded rubber extruded for 10 seconds was measured to determine an extrusion rate.

(ix) Glass transition temperature Tg

The glass transition temperature Tg of the ethylene copolymer rubber was measured by means of a differential scanning calorimeter (DSC). This glass transition temperature is an index of low-temperature flexibility of the ethylene copolymer rubber.

Temperature cycle in the measurement of Tg by DSC

A sample was heated from ordinary temperature (25° C.) to 180° C. at a rate of 20° C./min, kept at this temperature (180° C.) for 2 minutes, cooled to −80° C. at a rate of −20° C./min, kept at this temperature (−80° C.) for 2 minutes and heated again at a rate of 20° C./min, to determine the glass transition temperature Tg of the sample.

Example 1

In a 4 liter glass polymerization reactor equipped with a stirring blade, copolymerization reaction of ethylene, propylene, 5-ethylidene-2-norbornene (ENB) and 5-vinyl-2-norbornene (VNB) was continuously carried out.

In detail, to the polymerization reactor were continuously fed, at the top of the reactor, dehydrated and purified toluene at a feed rate of 1.2 l/hr, a toluene solution of (1,3-dimethylcyclopentadienyl)zirconium dichloride (Zr: 0.1 mmol/l) at a feed rate of 0.4 l/hr, a toluene solution of methylaluminoxane (MAO) (Al: 33.3 mmol/l) at a feed rate of 1.2 l/hr and a toluene solution of a mixture of ENB and VNB (total of ENB and VNB: 21.7 ml/l, ENB/VNB=5.5 (by volume)) at a feed rate of 1.2 l/hr.

Further, to the reactor were continuously fed ethylene at a feed rate of 200 l/hr and propylene at a feed rate of 200 l/hr at the top of the reactor.

The copolymerization reaction was conducted under the conditions of a temperature of 20° C. and a mean residence time of the reaction mixture of 30 minutes (i.e., polymerization scale: 2 liters).

The polymer solution obtained was continuously drawn out from the bottom of the reactor, and a small amount of methanol was added to the system to terminate the polymerization reaction.

The polymer solution drawn out was introduced into a large excess of methanol (as compared with the quantity of methanol required for terminating the polymerization reaction) to precipitate a polymer, and the polymer was recovered by filtration.

Then, the polymer was mixed with Irganox 1010 (trade name, available from Ciba-Geigy Co.) in an amount of 30 mg based on about 100 g of the polymer and Mark 329K (trade name, available from Asahi Denka K.K.) in an amount of 60 mg based on about 100 g of the polymer, both as stabilizers, and the resulting mixture was dried overnight at 120° C. under reduced pressure.

Through the above operation, an ethylene-propylene-ENB-VNB copolymer was obtained in an yield of 116 g per hour.

The copolymer thus obtained had a molar ratio of ethylene units to propylene units of 71/29, a molar ratio of ENB units to VNB units (ENB unit/VNB unit) of 5.8, an intrinsic viscosity (η) of 2.7 dl/g, an iodine value (IV value) of 19.5, an intensity ratio of $T\alpha\beta$ to $T\alpha\alpha$ in the $^{13}$C-NMR spectrum ($T\alpha\beta/T\alpha\alpha$) of less than 0.01, a gη* value of 0.55, a g' value of 0.61, a glass transition temperature Tg of −46° C. and a B value of 1.1.

Then, the ethylene-propylene-ENB-VNB copolymer was kneaded with active zinc white, stearic acid, dimethyldistearylammonium chloride, carbon black and oil shown in Table 1 by means of a 1.7 liter Banbury mixer.

To the resulting kneadate were added a vulcanizing agent and other ingredients than the above-mentioned ones (remainders) shown in Table 1, and they were kneaded by means of a 14 inch roll (F/B=50°/50° C.), to obtain a compounded rubber (rubber composition).

Then, the compounded rubber was extruded using a 60 mm extruder equipped with a tubular die (inner diameter: 10 mm, wall thickness: 1 mm) under the conditions of a die temperature of 80° C. and a cylinder temperature of 60° C., to obtain a tubular molded product.

The unvulcanized tubular molded product had a surface roughness of 8.

The molded product was then vulcanized in a hot-air vulcanizing bath at 220° C. for 6 minutes to obtain a sponge rubber.

The thus vulcanized sponge rubber was measured on various properties by the methods previously described. As a result, the specific gravity (density) was 0.49 (g/cm$^3$); the tensile stress at break ($T_B$) was 24 kg/cm$^2$; the tensile elongation at break ($E_B$) was 270%; the permanent compression set was 28%; and the shape retention ratio was 83%.

The results are set forth in Table 4.

The conditions of the synthesis of the ethylene-propylene-ENB-VNB copolymer are set forth in Tables 2 and 3.

The composition of the compounded rubber is set forth in Table 1.

TABLE 1

| Ingredient | | Part(s) by weight |
|---|---|---|
| Copolymer | Ethylene-propylene-ENB-VNB copolymer | 100 |
| Softener | Paraffinic oil (Sunlex 2280 of Nippon Sun Sekiyu K.K.) | 70 |
| Inorganic filler | SRF-HS carbon black (Asahi 50 HG of Asahi Carbon K.K.) | 90 |
| | Calcium oxide | 5 |
| Processing aid | Stearic acid | 2 |
| | Dimethylstearylammonium chloride | 2 |
| Vulcanizing agent | Sulfur | 1.5 |
| Vulcanization accelerator | Active zinc white | 5 |
| | 2-Mercaptobenzothiazole | 0.8 |
| | 2-(4'-Morpholinodithio)-benzothiazole | 1.2 |
| | Zinc dibutyldithiocarbamate | 2 |
| | Ethylenethiourea | 1 |
| Foaming agent | p,p'-Oxybis(benzene-sulfonylhydrazide) | 3.5 |

Examples 2–5

Copolymerization reaction was carried out in the same manner as in Example 1 except that the starting materials, the reaction conditions, etc. were varied to those shown in Tables 2 and 3, to prepare a copolymer.

Using the copolymer obtained, a rubber composition was prepared in the same manner as in Example 1, and the properties of the rubber composition were measured by the methods previously described.

The results are set forth in Table 4.

In Example 4, the tensile test, hardness test and permanent compression test were carried out in the same manner as in Example 6 described later, and the results are set forth in Table 8.

Comparative Example 1

An ethylene-propylene-ENB copolymer having an ethylene content of 70% by mol, an iodine value of 22 and an intrinsic viscosity ($\eta$) of 2.7 dl/g was synthesized using a $VO(OC_2H_5)Cl_2/(C_2H_5)_{1.5}AlCl_{1.5}$ catalyst in accordance with a conventionally known process.

Using the ethylene-propylene-ENB copolymer, a rubber composition was prepared and vulcanized in the same manner as in Example 1, and the properties of the rubber composition were measured by the methods previously described.

The results are set forth in Table 4.

The symbols in Tables 2 and 6 have the following meanings.

MAO: methylaluminoxane
VNB: 5-vinyl-2-norbornene
ENB: 5-ethylidene-2-norbornene
NBD: norbornadiene
OCPD: dicyclopentadiene
MOD: 7-methyl-1,6-octadiene Diene-1: nonconjugated polyene (c) containing, in one molecule, one carbon-to-carbon double bond polymerizable by a metallocene catalyst among carbon-to-carbon double bonds Diene-2: nonconjugated polyene (d) containing, in one molecule, two carbon-to-carbon double bonds polymerizable by a metallocene catalyst among carbon-to-carbon double bonds.

TABLE 3-continued

|  | g$\eta$* | g' | Tg (°C.) |
|---|---|---|---|
| Ex. 5 | 0.53 | 0.60 | −56 |
| Comp. Ex. 1 | 0.95 | 0.97 | −45 |

TABLE 4

|  | Ex. 1 | Ex. 2 | Ex. 3 | Ex. 5 | Comp. Ex. 1 |
|---|---|---|---|---|---|
| surface roughness (before vulcanizing) | 8 | 7 | 6 | 9 | 16 |
| specific gravity (g/cm$^3$) | 0.49 | 0.43 | 0.41 | 0.48 | 0.44 |
| T$_B$ (kg/cm$^2$) | 24 | 20 | 20 | 27 | 22 |
| E$_B$ (%) | 270 | 260 | 230 | 280 | 250 |
| permanent compression set (%) | 28 | 31 | 32 | 30 | 34 |
| shape retention ratio (%) | 83 | 84 | 80 | 81 | 64 |

Example 6

To a 2 liter stainless steel autoclave thoroughly purged with nitrogen were introduced 0.6 liter of hexane, 0.4 liter of 1-octene, 10 ml of ENB and 2.5 ml of VNB.

Then, ethylene was fed until the pressure in the system became 8 kg/cm$^2$-G.

Thereafter, a premix of 1 mmol of triisobutylaluminum, 0.004 mmol of rac-dimethylsilylenebis{1-(4-isopropyl-2,7-dimethylindenyl)}zirconium dichloride, 1.2 mmol (in terms of aluminum atom) of methylaluminoxane (MAO) and toluene was injected into the autoclave together with nitrogen to initiate polymerization.

Then, only ethylene was continuously fed to keep the total pressure at 8 kg/cm$^2$-G, and the polymerization was continued at 70° C. for 1 hour.

TABLE 2

|  | Zr mmol/l | MAO mmol/l | Ethylene l/h | α-olefin (l/h) | Diene-1 (ml/l) | Diene-2 (ml/l) | Yield g/h | Iodine Value (g) | Ethylene/ α-olefin mol/mol | Diene-1/ Diene-2 mol/mol | ($\eta$) dl/g | T$\alpha\beta$/T$\alpha\alpha$ | B value |
|---|---|---|---|---|---|---|---|---|---|---|---|---|---|
| Ex. 1 | 0.01 | 10 | 200 | propylene (200) | ENB (5.5) | VNB (1) | 116 | 19.5 | 71.0/ 29.0 | 5.8 | 2.7 | <0.01 | 1.1 |
| Ex. 2 | 0.01 | 10 | 160 | propylene (240) | ENB (6) | NBD (0.5) | 96 | 20.8 | 66.5/ 33.5 | 9.2 | 2.4 | <0.01 | 1.1 |
| Ex. 3 | 0.01 | 10 | 150 | propylene (250) | ENB (5) | OCPD (3) | 52 | 24.9 | 69.9/ 30.1 | 2.8 | 2.2 | <0.01 | 1.1 |
| Ex. 4 | 0.01 | 10 | 200 | propylene (200) | MOD (20) | VNB (0.5) | 103 | 13.3 | 70.5/ 29.5 | 3.0 | 2.8 | <0.01 | 1.1 |
| Ex. 5 | 0.01 | 10 | 65 | 1-butene (235) | ENB (5.5) | VNB (1) | 53 | 18.6 | 78.6/ 21.4 | 5.9 | 2.9 | <0.01 | 1.1 |
| Comp. Ex. 1 |  |  |  | propylene | ENB |  |  | 22.0 | 70.0/ 30.0 |  | 2.7 | 1.4 | 1.1 |

*Each value for Zr, MAO and dienes shows a Zr, MAO or diene concentration in the polymerization system.
**NBD: norbornadiene, OCPD: dicyclopentadiene, MOD: 7-methyl-1,6-octadiene

TABLE 3

|  | g$\eta$* | g' | Tg (°C.) |
|---|---|---|---|
| Ex. 1 | 0.55 | 0.61 | −46 |
| Ex. 2 | 0.62 | 0.67 | −47 |
| Ex. 3 | 0.75 | 0.80 | −46 |
| Ex. 4 | 0.69 | 0.75 | −55 |

A small amount of methanol was added to the system to terminate the polymerization, and the unreacted monomers were purged out.

The polymer solution obtained was introduced into a large excess of methanol (as compared with the quantity of methanol required for terminating the polymerization reaction) to precipitate a polymer, and the polymer was recovered by filtration.

Then, the polymer was mixed with Irganox 1010 (available from Ciba-Geigy Co.) in an amount of 30 mg based on about 100 g of the polymer and Mark 329K (available from Asahi Denka K.K.) in an amount of 60 mg based on about 100 g of the polymer, both as stabilizers, and the resulting mixture was dried overnight at 120° C. under reduced pressure.

As a result, an ethylene-1-octene-ENB-VNB copolymer was obtained in an yield of 56 g per hour.

This copolymer had a molar ratio of ethylene units to 1-octene units of 74.9/25.1, a molar ratio of ENB units to VNB units (ENB unit/VNB unit) of 4.5, an intrinsic viscosity ($\eta$) of 2.2 dl/g, an iodine value (IV value) of 12.5, an intensity ratio of $T\alpha\beta$ to $T\alpha\alpha$ in the $^{13}$C-NMR spectrum ($T\alpha\beta/T\alpha\alpha$) of less than 0.01, a $g\eta^*$ value of 0.58, a g' value of 0.64, a glass transition temperature Tg of −58° C. and a B value of 1.1.

Then, using the copolymer and the compounding ingredients shown in Table 5, a compounded rubber (rubber composition) was prepared in the same manner as in Example 1.

TABLE 5

| Ingredient | | Part(s) by weight |
|---|---|---|
| Copolymer | Ethylene-1-octene-ENB-VNB copolymer | 100 |
| Softener | Paraffinic oil (P 200 of Japan Energy K.K.) | 20 |
| Inorganic filler | Talc (Mistron Vapor Talc of Nippon Mistron K.K.) | 100 |
| Processing aid | Stearic acid | |
| Vulcanizing agent | Dicumyl peroxide | 6.8 |
| Vulcanization accelerator | Zinc white No. 1 | 5 |
| Vulcanization aid | 4,4'-Dibenzoylquinone dioxime | 3.5 |

The compounded rubber was extruded into a sheet using a 60 mm extruder equipped with a flat die (size: 2 mm height, 30 mm width) under the conditions of a head temperature of 80° C., a die temperature of 70° C. and a cylinder temperature of 60° C.

The unvulcanized molded product in the form of a sheet had a surface condition of 4 and an extrusion rate of 180 cm/10 sec.

The molded product in the form of a sheet was then vulcanized at 160° C. for 10 minutes to obtain a vulcanized rubber sheet having a thickness of 2 mm.

The vulcanized rubber sheet was measured on various properties by the methods previously described. As a result, the tensile stress at break ($T_B$) was 80 kg/cm$^2$; the tensile elongation at break ($E_B$) was 540%; the Hs hardness was 64; with regard to the thermal aging resistance, the tensile strength retention ratio $A_R(T_B)$ was 103%, the elongation retention ratio $A_R(E_B)$ was 99%, and the change of hardness $A_H$ was +2; and the permanent compression set (low-temperature flexibility) was 10.

The results are set forth in Table 8.

The conditions of the synthesis of the ethylene-1-octene-ENB-VNB copolymer are set forth in Tables 6 and 7.

Example 7

An ethylene copolymer rubber was prepared in the same manner as in Example 6 except that the amount of ENB and the amount of VNB were varied to 15 ml and 3.5 ml, respectively.

Thus, an ethylene-1-octene-ENB-VNB copolymer (rubber) was obtained in an yield of 48 g per hour.

This copolymer had a molar ratio of ethylene units to 1-octene units of 75.5/24.5, a molar ratio of ENB units to VNB units (ENB unit/VNB unit) of 4.7, an intrinsic viscosity ($\eta$) of 2.0 dl/g, an iodine value (IV value) of 16.5, an intensity ratio of $T\alpha\beta$ to $T\alpha\alpha$ in the $^{13}$C-NMR spectrum ($T\alpha\beta/T\alpha\alpha$) of less than 0.01, a $g\eta^*$ value of 0.52, a g' value of 0.59, a glass transition temperature Tg of −57° C. and a B value of 1.1.

Using the copolymer obtained, a rubber composition was prepared in the same manner as in Example 6, and the properties of the rubber composition were measured by the methods previously described.

The results are set forth in Table 8.

The conditions of the synthesis of the copolymer are set forth in Tables 6 and 7.

Example 8

An ethylene copolymer rubber was prepared in the same manner as in Example 6 except that 1-octene was replaced with 0.24 Nl of 1-butene.

Thus, an ethylene-1-butene-ENB-VNB copolymer (rubber) was obtained in an yield of 65 g per hour.

This copolymer had a molar ratio of ethylene units to 1-butene units of 78/22, a molar ratio of ENB units to VNB units (ENB unit/VNB unit) of 3.8, an intrinsic viscosity ($\eta$) of 2.1 dl/g, an iodine value (IV value) of 14.5, an intensity ratio of $T\alpha\beta$ to $T\alpha\alpha$ in the $^{13}$C-NMR spectrum ($T\alpha\beta/T\alpha\alpha$) of less than 0.01, a $g\eta^*$ value of 0.53, a g' value of 0.58, a glass transition temperature Tg of −55° C. and a B value of 1.1.

Using the copolymer obtained, a rubber composition was prepared in the same manner as in Example 6, and the properties of the rubber composition were measured by the methods previously described.

The results are set forth in Table 8.

The conditions of the synthesis of the copolymer are set forth in Tables 6 and 7.

Comparative Example 2

An ethylene-propylene-ENB copolymer rubber was prepared in the same manner as in Example 6 except that only ENB was used as a diene ingredient, propylene used in place of 1-octene was fed such that the initial pressure became 5 kg/cm$^2$-G, followed by feeding ethylene until the pressure in the system became 8 kg/cm$^2$-G, and the polymerization temperature was varied to 80° C. from 70° C.

Thus, an ethylene-propylene-ENB terpolymer (rubber) was obtained in an yield of 40 g per hour.

This copolymer had a molar ratio of ethylene units to propylene units of 70/30, an intrinsic viscosity [$\eta$] of 2.1 dl/g, an iodine value (IV value) of 14, an intensity ratio of $T\alpha\beta$ to $T\alpha\alpha$ in the $^{13}$C-NMR spectrum ($T\alpha\beta/T\alpha\alpha$) of less than 0.01, a $g\eta^*$ value of 0.97, a g' value of 0.98, a glass transition temperature Tg of −49° C. and a B value of 1.1.

Using the copolymer obtained, a rubber composition was prepared in the same manner as in Example 6, and the properties of the rubber composition were measured by the methods previously described.

The results are set forth in Table 8.

The conditions of the synthesis of the copolymer are set forth in Tables 6 and 7.

TABLE 6

| | ethylene total pressure (kg/cm²G) | α-olefin | Diene-1 (ml/l) | Diene-2 (ml/l) | yield g/h |
|---|---|---|---|---|---|
| Ex. 6 | 8 | 1-octene (0.4 l) | ENB (10) | VNB (2.5) | 56 |
| Ex. 7 | 8 | 1-octene (0.4 l) | ENB (10) | VNB (3.5) | 48 |
| Ex. 8 | 8 | 1-butene (0.24 Nl) | ENB (10) | VNB (2.5) | 65 |
| Comp. Ex. 2 | 8 | propylene (5 kg/cm²G) | ENB (10) | — | 40 |

| | Iodine Value (g) | ethylene/α-olefin mol/mol | Diene-1/Diene-2 mol/mol | (η) dl/g | Tαβ/Tαα | B value |
|---|---|---|---|---|---|---|
| Ex. 6 | 12.5 | 74.9/25.1 | 4.5 | 2.2 | <0.01 | 1.1 |
| Ex. 7 | 16.5 | 75.5/24.5 | 4.7 | 2.0 | <0.01 | 1.1 |
| Ex. 8 | 14.5 | 78/22 | 3.8 | 2.1 | <0.01 | 1.1 |
| Comp. Ex. 2 | 14 | 70.0/30.0 | — | 2.1 | <0.01 | 1.1 |

*Each value for Zr, MAO and dienes shows a Zr, MAO or diene concentration in the polymerization system.
**NBD: norbornadiene, OCPD: dicyclopentadiene, MOD: 7-methyl-1,6-octadiene

TABLE 7

| | gη* | g' | Tg (°C.) |
|---|---|---|---|
| Ex. 6 | 0.58 | 0.64 | −58 |
| Ex. 7 | 0.52 | 0.59 | −57 |
| Ex. 8 | 0.53 | 0.58 | −55 |
| Comp. Ex. 2 | 0.97 | 0.98 | −49 |

TABLE 8

| | Ex. 4 | Ex. 6 | Ex. 7 | Ex. 8 | Comp. Ex. 2 |
|---|---|---|---|---|---|
| extrution rate cm/10 sec. | 120 | 180 | 200 | 170 | 100 |
| surface condition | 4 | 4 | 5 | 4 | 1* |
| $T_B$ (g/cm²) | 120 | 80 | 82 | 95 | 80 |
| $E_B$ (%) | 480 | 540 | 500 | 520 | 560 |
| $H_S$ | 67 | 64 | 65 | 66 | 66 |
| thermal aging resistance | | | | | |
| $A_R$ ($T_B$) | 112 | 103 | 102 | 103 | 110 |
| $A_R$ ($E_B$) | 92 | 99 | 98 | 97 | 94 |
| AH | +6 | +2 | +3 | +2 | +5 |
| Permanent compression set (%) −40° C. × 22 hr. | 21 | 10 | 12 | 16 | 28 |

Note: *: melt fracture occurred during extreusion molding

What is claimed is:

1. An ethylene copolymer rubber which is a random copolymer rubber of (a) ethylene, (b) an α-olefin of 4 to 20 carbon atoms, (c) a nonconjugated polyene containing, in one molecule, one carbon-to-carbon double bond polymerizable by a metallocene catalyst among carbon-to-carbon double bonds, and (d) a nonconjugated polyene containing, in one molecule, two carbon-to-carbon double bonds polymerizable by the metallocene catalyst among carbon-to-carbon double bonds, and has the following properties:

(i) said copolymer rubber contains (a') units from ethylene and (b') units from the α-olefin of 4 to 20 carbon atoms in a molar ratio of 90/10 to 40/60 ((a')/(b')), (ii) said copolymer rubber contains 0.1 to 10% by mol of (c') units from the nonconjugated polyene containing, in one molecule, one carbon-to-carbon double bond polymerizable by the metallocene catalyst among carbon-to-carbon double bonds, (iii) said copolymer rubber contains 0.1 to 3% by mol of (d') units from the nonconjugated polyene containing, in one molecule, two carbon-to-carbon double bonds polymerizable by the metallocene catalyst among carbon-to-carbon double bonds, (iv) the intrinsic viscosity (η), as measured in decahydronaphthalene at 135° C., is in the range of 0.1 to 10 dl/g, (v) the intensity ratio D of Tαβ to Tαα in the $^{13}$C-NMR spectrum, Tαβ/Tαα, is not more than 0.5, and (vi) the glass transition temperature Tg, as determined by DSC, is not higher than −50° C.

2. The ethylene copolymer rubber as claimed in claim 1, wherein a ratio gη* of the intrinsic viscosity (η) of said ethylene copolymer rubber determined in the property (iv) to the intrinsic viscosity (η)$_{blank}$ of a linear ethylene-propylene copolymer having the same weight-average molecular weight (measured by a light scattering method) as said ethylene copolymer rubber and having an ethylene content of 70% by mol, (η)/(η)blank, is not more than 0.9.

3. The ethylene copolymer rubber as claimed in claim 1 or 2, wherein a ratio g' of the intrinsic viscosity (η) of said ethylene copolymer rubber determined in the property (iv) to the intrinsic viscosity (η)$_{blank}$' in terms of a linear ethylene-propylene copolymer having an ethylene content of 70% by mol, as determined by gel permeation chromatography (GPC, 140° C., o-dichlorobenzene solvent) of said ethylene copolymer rubber, (η)/(η)$_{blank}$', is not more than 0.9.

4. A process for preparing the ethylene copolymer rubber as claimed in claim 1 or 2, comprising random copolymerizing, in the presence of a metallocene catalyst, (a) ethylene, (b) an α-olefin of 4 to 20 carbon atoms, (c) a nonconjugated polyene containing, in one molecule, one carbon-to-carbon double bond polymerizable by the metallocene catalyst among carbon-to-carbon double bonds, and (d) a nonconjugated polyene containing, in one molecule, two carbon-to-carbon double bonds polymerizable by the metallocene catalyst among carbon-to-carbon double bonds.

5. The process for preparing an ethylene copolymer rubber as claimed in claim 4, wherein the metallocene catalyst contains a metallocene compound represented by the following formula (III) or (IV):

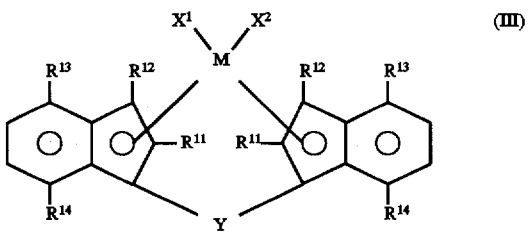

(III)

wherein M is a transition metal of Group IVB of the periodic table, $R^{11}$ and $R^{12}$ are each hydrogen, a halogen atom, a hydrocarbon group of 1 to 20 carbon atoms which may be substituted with halogen, a silicon-containing group, an oxygen-containing group, a sulfur-containing group, a nitrogen-containing group or a phosphorus-containing group, R¹³ and R¹⁴ are each an alkyl group of 1 to 20 carbon atoms, X¹ and X² are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group —O—, —CO—, —S—, —SO—, —SO₂—, —NR⁷—, —P(R⁷)—, —P(O)(R⁷)—, —BR⁷— or —AlR⁷— (R⁷ is hydrogen, a halogen atom, a hydrocarbon group of 1 to 20 carbon atoms or a halogenated hydrocarbon group of 1 to 20 carbon atoms);

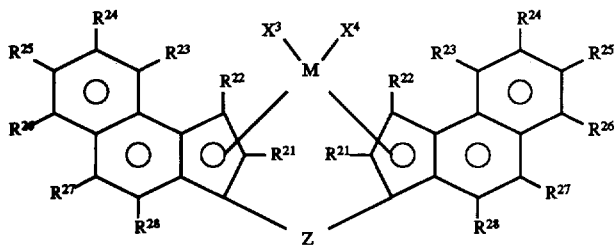

wherein M is a transition metal of Group IVB of the periodic table,

R²¹'s may be the same as or different from each other, and are each hydrogen, a halogen atom, an alkyl group of 1 to 10 carbon atoms which may be halogenated, an aryl group of 6 to 10 carbon atoms, —NR₂, —SR, —OSiR₃, —SiR₃ or —PR₂ (R is a halogen atom, an alkyl group of 1 to 10 carbon atoms or an aryl group of 6 to 10 carbon atoms), R²² to R²⁸ are each the same as R²¹, or adjacent two of R²² to R²⁸ may form an aromatic or aliphatic ring together with an atom to which they are bonded, X³ and X⁴ may be the same as or different from each other, and are each hydrogen, a halogen atom, OH group, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms, and Z is

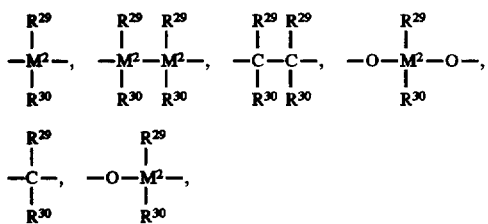

=BR²⁹, =AlR²⁹, —Ge—, —Sn—, —O—, —S—, =SO, —SO₂, =NR²⁹, =CO, =PR²⁹ or =p(O)R²⁹ (R²⁹ and R³⁰ may be the same as or different from each other, they are each hydrogen, a halogen atom, an alkyl group of 1 to 10 carbon atom, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon 5 atoms or an alkylaryl group of 7 to 40 carbon atoms, or R²⁹ and R³⁰ may form a ring together with an atom to which they are bonded, and M² is silicon, germanium or tin).

6. A rubber composition comprising the ethylene copolymer rubber as claimed in claim 1 or 2 and at least one ingredient selected from the following ingredients:

a reinforcing agent in an amount of not more than 300 parts by weight based on 100 parts by weight of the ethylene copolymer rubber, a softener in an amount of not more than 200 parts by weight based on 100 parts by weight of the ethylene copolymer rubber, and a vulcanizing agent.

7. A process for preparing the ethylene copolymer rubber as claimed in claim 3, comprising random copolymerizing, in the presence of a metallocene catalyst, (a) ethylene, (b) an α-olefin of 4 to 20 carbon atoms, (c) a nonconjugated polyene containing, in one molecule, one carbon-to-carbon double bond polymerizable by the metallocene catalyst among carbon-to-carbon double bonds, and (d) a nonconjugated polyene containing, in one molecule, two carbon-to-carbon double bonds polymerizable by the metallocene catalyst among carbon-to-carbon double bonds.

8. The process for preparing an ethylene copolymer rubber as claimed in claim 9, wherein the metallocene catalyst contains a metallocene compound represented by the following formula (III) or (IV):

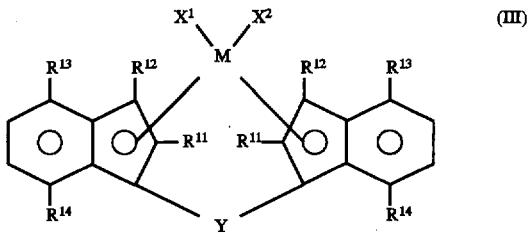

wherein M is a transition metal of Group IVB of the periodic table,

R¹¹ and R¹² are each hydrogen, a halogen atom, a hydrocarbon group of 1 to 20 carbon atoms which may be substituted with halogen, a silicon-containing group, an oxygen-containing group, a sulfur-containing group, a nitrogen-containing group or a phosphorus-containing group, R¹³ and R¹⁴ are each an alkyl group of 1 to 20 carbon atoms, X¹ and X² are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group —O—, —CO—, —S—, —SO—, —SO$_2$—, —NR$^7$—, —P(R$^7$)—, P(O)(R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms);

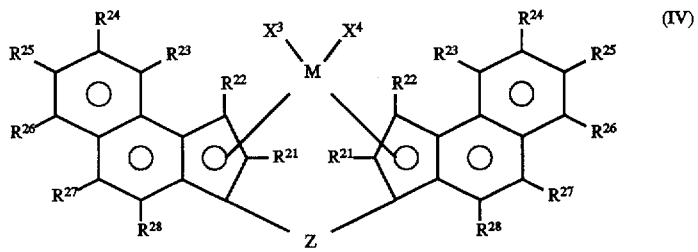 (IV)

wherein M is a transition metal of Group IVB of the periodic table,

R$^{21}$'s may be the same as or different from each other, and are each hydrogen, a halogen atom, an alkyl group of 1 to 10 carbon atoms which may be halogenated, an aryl group of 6 to 10 carbon atoms, —NR$_2$, —SR, —OSiR$_3$, —SiR$_3$ or —PR$_2$ (R is a halogen atom, an alkyl group of 1 to 10 carbon atoms or an aryl group of 6 to 10 carbon atoms), R$^{22}$ to R$^{28}$ are each the same as R$^{21}$, or adjacent two of R$^{22}$ or R$^{28}$ may form an aromatic or aliphatic ring together with an atom to which they are bonded, X$^3$ and X$^4$ may be the same as or different from each other, and are each hydrogen, a halogen atom, OH group, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms, and Z is

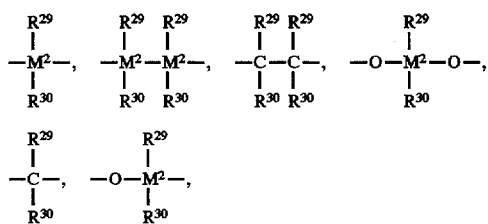

=BR$^{29}$, =AlR$^{29}$, —Ge, —Sn—, —O—, —S—, =SO, —SO$_2$, =NR$^{29}$, =CO, =PR$^{29}$ or =p(O)R$^{29}$ (R$^{29}$ and R$^{30}$ may be the same as or different from each other, they are each hydrogen, a halogen atom, an alkyl group of 1 to 10 carbon atoms, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 20 carbon atoms, an arylalkyl group of 7 to 40 carbon atoms, an arylalkenyl group of 8 to 40 carbon atoms or an alkylaryl group of 7 to 40 carbon atoms, or R$^{29}$ and R$^{30}$ may form a ring together with an atom to which they are bonded, and M$^2$ is silicon, germanium or tin).

9. A rubber composition comprising the ethylene copolymer rubber as claimed in claim 3 and at least one ingredient selected from the following ingredients:

a reinforcing agent in an amount of not more than 300 parts by weight based on 100 parts by weight of the ethylene copolymer rubber, a softener in an amount of not more than 200 parts by weight based on 100 parts by weight of the ethylene copolymer rubber, and a vulcanizing agent.

10. The ethylene copolymer rubber as claimed in claim 1, wherein the molar ratio of the units (C') to the units (d') is in the range of 1/3 to 30/1.

* * * * *